United States Patent
Yasui et al.

(10) Patent No.: US 6,493,458 B2
(45) Date of Patent: Dec. 10, 2002

(54) LOCAL POSITIONING APPARATUS, AND METHOD THEREFOR

(75) Inventors: Nobuhiko Yasui, Osaka; Atsushi Iisaka, Takatsuki; Mamoru Kaneko, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/216,957

(22) Filed: Dec. 21, 1998

(65) Prior Publication Data

US 2002/0031242 A1 Mar. 14, 2002

Related U.S. Application Data

(62) Division of application No. 08/917,815, filed on Aug. 27, 1997, now Pat. No. 6,091,833.

(30) Foreign Application Priority Data

Aug. 28, 1996 (JP) .............................. 8-226610
Aug. 28, 1996 (JP) .............................. 8-226611

(51) Int. Cl.$^7$ ................................................ G06K 9/00
(52) U.S. Cl. ....................... 382/104; 382/100; 382/103; 382/199; 3218/118
(58) Field of Search ................................. 382/100, 104, 382/103, 169, 199, 170, 194; 340/995; 73/146; 701/208, 93; 348/118

(56) References Cited

U.S. PATENT DOCUMENTS

| | | | | |
|---|---|---|---|---|
| 4,653,316 A | * | 3/1987 | Fukuhara | ...................... 73/146 |
| 4,970,653 A | * | 11/1990 | Kenue | ......................... 364/461 |
| 4,984,075 A | | 1/1991 | Munaoka | ..................... 348/26 |
| 5,008,946 A | * | 4/1991 | Ando | ............................ 382/2 |
| 5,016,007 A | * | 5/1991 | Iihishi et al. | ................ 340/995 |
| 5,359,666 A | | 10/1994 | Nakayama et al. | ......... 382/104 |
| 5,379,353 A | * | 1/1995 | Hasegawa et al. | .......... 382/104 |
| 5,410,346 A | * | 4/1995 | Saneyoshi et al. | .......... 348/116 |
| 5,650,944 A | * | 7/1997 | Kise | ............................ 364/561 |
| 5,835,614 A | * | 11/1998 | Aoyama et al. | ............. 382/104 |
| 5,978,731 A | * | 11/1999 | Matsuda | ...................... 701/208 |
| 6,067,497 A | * | 5/2000 | Sekine et al. | ................... 701/93 |
| 6,128,088 A | * | 10/2000 | Nishiwaki | .................... 358/392 |
| 6,205,234 B1 | * | 3/2001 | Kakinami et al. | ........... 382/104 |

FOREIGN PATENT DOCUMENTS

| | | | | |
|---|---|---|---|---|
| JP | 2-90379 | 3/1990 | ............ | G06K/9/00 |
| JP | 2-90380 | 3/1990 | ............ | G06K/9/00 |
| JP | 2-90381 | 3/1990 | ............ | G06K/9/00 |
| JP | 4-138505 | 5/1992 | ............ | G06K/9/00 |
| JP | 07-146137 | 6/1995 | ............ | G06K/9/00 |
| JP | 08-184417 | 7/1996 | ............ | G06K/9/00 |

* cited by examiner

*Primary Examiner*—Leo Boudreau
*Assistant Examiner*—Barry ChooBin
(74) *Attorney, Agent, or Firm*—Wenderoth, Lind & Ponack, L.L.P.

(57) ABSTRACT

An apparatus and method for correctly determining the position of a vehicle in a traffic lane by obtaining correct information about the position of the traffic lane without being affected by variations in the road surface, weather, time of day, or such imaging conditions as fixed or moving lighting, are provided. An edge signal of a high spatial frequency component and a luminance signal of a low spatial frequency component of a digital image signal representing the view of the local area to the front of a vehicle are extracted. A road contour signal is then extracted from the edge signal, and a road region signal is extracted from the luminance signal. The position of the lane Sre is then detected with high precision by evaluating the lane contour Sre based on the road region signal Srr and lane contour data Sre.

7 Claims, 30 Drawing Sheets

R

LOCAL POSITIONING APPARATUS, AND METHOD THEREFOR

This application is a Rule 1.53(b) Divisional application of application Ser. No. 08/917,815, filed Aug. 27, 1997, now U.S. Pat. No. 6,091,833.

BACKGROUND OF THE INVENTION

Field of the Invention

The present invention relates to a local positioning apparatus used in a local positioning system particularly suited to detecting the condition of a subject, such as an automobile or other motor vehicle, on a road while either stationary or moving based on such local positioning information as the relative location, velocity, and attitude of the subject within a localized region with reference to an image obtained by imaging the area in front of the subject. More specifically, the present invention relates to a local positioning apparatus for correctly detecting the position of a subject within a localized region without being affected by changes in the condition of the road surface, weather, time of day, fixed lighting, moving lighting, and other changes in the imaging condition.

A local positioning apparatus according to the prior art used in an automobile is shown in FIG. 25 and described below. As shown in FIG. 25, this conventional local positioning apparatus LPP comprises an edge extractor 1P, threshold generator 3P, contour extractor 5P, matching operator 9P, lane (marker) contour extractor 11P, region limiter 13P, current position detector 15P, curvature detector 17P, and yaw angle detector 19P.

The edge extractor 1P is connected to a digital imaging apparatus 100 (FIG. 1). The digital imaging apparatus 100 is mounted to the subject, which in this explanation of the prior art and the specification of the present invention below is, by way of example only, an automobile AM (FIG. 4), for capturing a perspective image Vi of the view to the front of the automobile AM in the direction of travel, and generating a digital image signal Si of the perspective image Vi. Included in the perspective image Vi are an image of the road, the lane markers Lm1 and Lm2 defining the boundaries (sides) of the lane Lm in which the automobile AM is currently travelling, and a lane marker Lm3 defining the far boundary of an adjacent lane (FIG. 5). The edge extractor 1P extracts the edge pixels of the lane markers Lm1, Lm2, and Lm3 from the digital image signal Si, and generates an extracted edge pixel signal Sx'. The extracted edge pixel signal Sx' contains only the edge pixels extracted by the edge extractor 1P, and thus represents an extracted edge image Vx'.

Using a known method, the threshold generator 3P scans the extracted edge pixel signal Sx' to extract a line for each of the lanes Lm delineated by the lane markers Lm1, Lm2, and Lm3, and determines a threshold value Eth' for extracting pixels representing the contours of the lane markings from the extracted edge pixel signal Sx'. Using the supplied threshold value Eth', the contour extractor 5P then extracts contour pixels and generates an extracted contour signal Sc' representing the contour lines of the lane markings.

The matching operator 9P then determines the line segment or arc matching the contour lines contained in the extracted contour signal Sc', and generates matching data Sm' containing all of the matching line and arc segments.

The lane contour extractor 11P then compares the matching data Sm' with typical lane dimension characteristics stored in memory to extract the matching line elements meeting these dimensional criteria as the contour lines of the lane, and outputs the result as lane extraction signal Smc'.

Based on this lane extraction signal Smc', the region limiter 13P defines a certain region around the extracted lane, and generates a region signal Sr' delimiting this lane region. By feeding this region signal Sr' back to the edge extractor 1P, the edge extractor 1P limits the area within the perspective image Vi used for edge extraction to the region limits defined by the region limiter 13P.

Using the lane extraction signal Smc' from the lane contour extractor 11P, the current position detector 15P detects the position of the automobile AM on the road, or more specifically in relationship to the lane being followed.

The curvature detector 17P detects the curvature of the lane being followed while the automobile AM is moving. The yaw angle detector 19P detects the angle of the automobile AM relative to the lane, i.e., whether the automobile AM is travelling parallel to the sides of the lane or is following a course while would result in the automobile AM leaving the current lane being followed.

It should be noted that all of the processes described above are based on the perspective image Vi of the area to the front of the vehicle obtained by the digital imaging apparatus 100. It is obvious, however, that correct information about the lane dimensions cannot be obtained from the perspective image Vi because the perspective image is a simple two-dimensional representation of three-dimensional space. Specifically, shapes change in the perspective image Vi as the distance from the digital imaging apparatus 100 increases with the size of an object at a distance from the digital imaging apparatus 100 being displayed smaller than the same object in close proximity to the digital imaging apparatus 100. In addition, the edges of a road or lane are indistinct in a perspective image Vi, making edge detection difficult.

Road conditions are also not constant, and this further complicates road edge detection. For example, recognizing the contour of a road or lane by means of edge detection is, in fact, impossible when the side of a road or a lane marker is hidden by such as vegetation, dirt, or gravel. Edge detection is also not practically possible when the lane markers are not recognizable in part or in full because of soiling, damage, or other cause.

The brightness of the road surface is also extremely variable, and is affected by such factors as the weather, whether the road is inside a tunnel, and whether it is day or night. Stationary lights installed in tunnels and beside the road also only partially and locally illuminate the road surface, and spots of extreme brightness or darkness can result even from the same road surface. These conditions are further complicated at night by irregular changes in illumination resulting both from the headlights of the subject automobile AM and the headlights of other vehicles. Accurately determining the edge detection threshold value Eth' is effectively impossible under environments subject to changes in driving conditions, time of day, and weather, as well as dynamic changes in brightness in the perspective image Vi due to fixed or moving lighting even when the driving conditions, time, and weather remain constant.

In other words, it is not possible to obtain accurate dimensional information about the road and lane from an extracted contour signal Sc' that is based on such an inaccurate threshold value Eth'.

It is therefore clearly extremely dangerous to detect the local positioning of a vehicle relative to a road or lane based on such unreliable, inaccurate, and distorted dimensional information, and to detect the road curvature and vehicular yaw based on such erroneously determined positioning information.

SUMMARY OF THE INVENTION

The object of the present invention is therefore to resolve the above problems by providing a local positioning apparatus for detecting the local position of a subject capable of advancing in a direction related to a lane within a localized region based on a digital image signal representing a localized region in the direction of subject travel. To achieve this object, the local positioning apparatus comprises a first image signal generator for extracting a high frequency component of a spatial frequency from the digital image signal to generate an edge signal; a contour extractor for extracting lane contours based on the edge signal, and generating lane contour data; a second image signal generator for extracting a low frequency component of a spatial frequency from the digital image signal to generate a luminance signal; a lane area extractor for extracting the lane area based on the luminance signal, and generating lane area data; and a lane detector for detecting a lane position and generating a lane detection signal based on the lane contour data and lane area data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
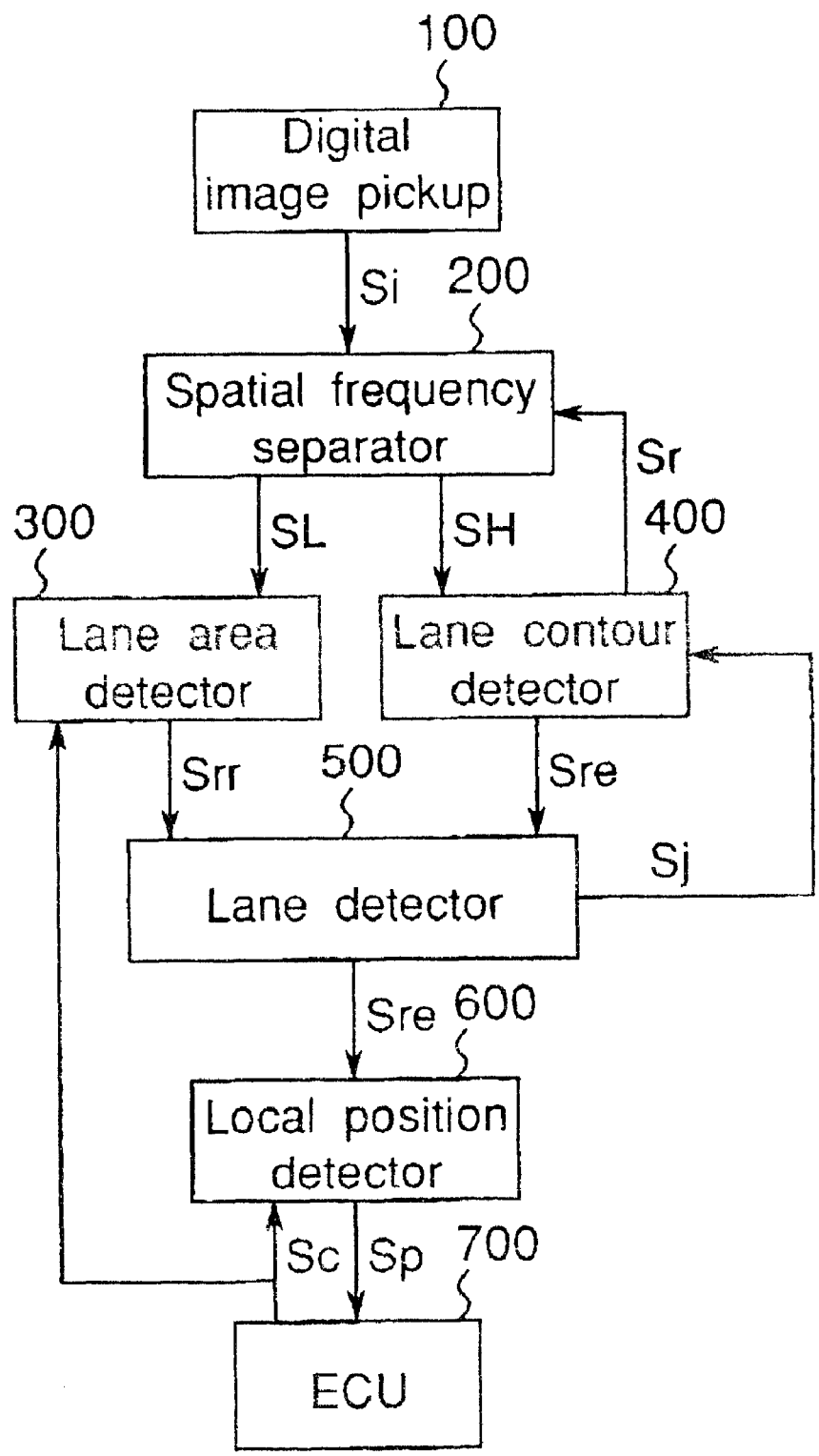
FIG. 1 is a block diagram of a local positioning apparatus according to a first embodiment of the present invention.

FIG. 1 is a block diagram of a local positioning apparatus LP according to a first embodiment of the present invention. This local positioning apparatus LP is used on board motor vehicles such as automobiles AM and other types of vehicles that are capable of traversing a freely defined path of travel.

As shown in FIG. 1, the local positioning apparatus LP comprises a digital imaging apparatus 100, spatial frequency separator 200, lane area detector 300, lane contour detector 400, lane detector 500, a local position detector 600, and electronic control unit (ECU) 700. Note that the ECU 700 is a device commonly used and known in the automobile industry, and is used to detect the vehicle condition as represented by the speed of travel and steering condition, generate a vehicle condition signal Sc, which includes a velocity signal Sv and steering signal Ss, and controls the various electrical devices of the vehicle.

The digital imaging apparatus 100 comprises a Ph×PV pixel matrix of imaging elements, and continuously captures images of the subject, i.e., the area to the front in the direction of travel, where Ph is the number of horizontal pixels and PV is the number of vertical pixels. Increasing pixel counts Ph and PV can be used to improve image resolution, and to therefore improve the positioning precision of the present invention. Increasing the pixel count, however, also increases the manufacturing cost, and the pixel count must therefore be determined by balancing the required resolution against the manufacturing cost. While a digital imaging apparatus 100 according to an exemplary embodiment of the invention described below has a 428 (Ph) by 268 (PV) pixel imaging device, the invention shall obviously not be so limited.

The digital imaging apparatus 100 is mounted toward the, front of the automobile AM, and from this position continuously images a view Vi in the direction of travel of the automobile AM to generate a digital image signal Si. This view Vi is a perspective image Vi of the area to the front of the automobile AM as seen from the automobile AM. Furthermore, this perspective image Vi can be either a still image or a motion picture.

The spatial frequency separator 200 is connected to the digital imaging apparatus 100, and receives therefrom the digital image signal Si. The spatial frequency separator 200 thus extracts a low frequency component from the digital image signal Si to generate a low spatial frequency signal SL, and extracts a high frequency component to generate a high spatial frequency signal SH.

The lane area detector 300 is connected to the spatial frequency separator 200, and receives therefrom the low spatial frequency signal SL, based on which the lane area detector 300 detects the road surface from the perspective image Vi to generate a road region signal Srr.

The lane contour detector 400 is likewise connected to the spatial frequency separator 200, receives therefrom the high spatial frequency signal SH, thus detects the contour of the road from the perspective image Vi, and generates a road contour signal Sre. The lane contour detector 400 also generates a region limiting signal sr that limits the scanning area used for contour detection, and inputs this signal to the spatial frequency separator 200. More specifically, the region limiting signal Sr is used to limit the area in the perspective image Vi that is scanned for contour detection to the area around the detected contour as a means of reducing the processing load. The spatial frequency separator 200 then extracts the high spatial frequency signal SH only from the area of the digital image signal Si specified by the region limiting signal Sr.

The lane detector 500 is connected to the lane area detector 300 and the lane contour detector 400, and thus receives both the road region signal Srr and the road contour signal Sre. Based on the road region signal Srr, the lane detector 500 determines whether the road contour indicated by the road contour signal Sre is correct, and generates a road judgment signal Sj indicating the result of this evaluation. The road judgement signal Sj is then fed back to the lane contour detector 400. If and only if the lane detector 500 determines that the read contour indicated by the road contour signal Sre is correct does the lane detector 500 pass the road contour signal Sre to the local position detector 600.

The lane contour detector 400 updates the road contour signal Sre based on the feedback of the road judgement signal Sj, and again outputs the road contour signal Sre to the lane detector 500. The lane contour detector 400 continues to update the road contour signal Sre according to the road judgement signal Sj until the lane detector 500 determines that the road contour signal Sre represents a correct road contour, and the road contour signal Sre is thus output only after it is determined to represent a correct road contour.

The local position detector 600 thus receives the road contour signal Sre from the lane detector 500, and a vehicle condition signal Sc input from the ECU 700. Based on the road contour signal Sre, which thus represents a reliable road contour, and the vehicle condition signal Sc indicative of the operating status of the motor vehicle, the local position detector 600 detects the moving or stationary position of the automobile AM, and thus generates a position detection signal Sp. It should be noted that a method and apparatus for generating an ECU control signal for controlling vehicle operation, and navigation and control signals for a navigation apparatus, based on this position detection signal Sp are disclosed in Japanese patent application H8-102892 (1996-102892; filed Apr. 24, 1996), and U.S. patent application Ser. No. 08/637,417 (file Apr. 25, 1996), both entitled and assigned to the same assignee as the present application.

Figure 4:
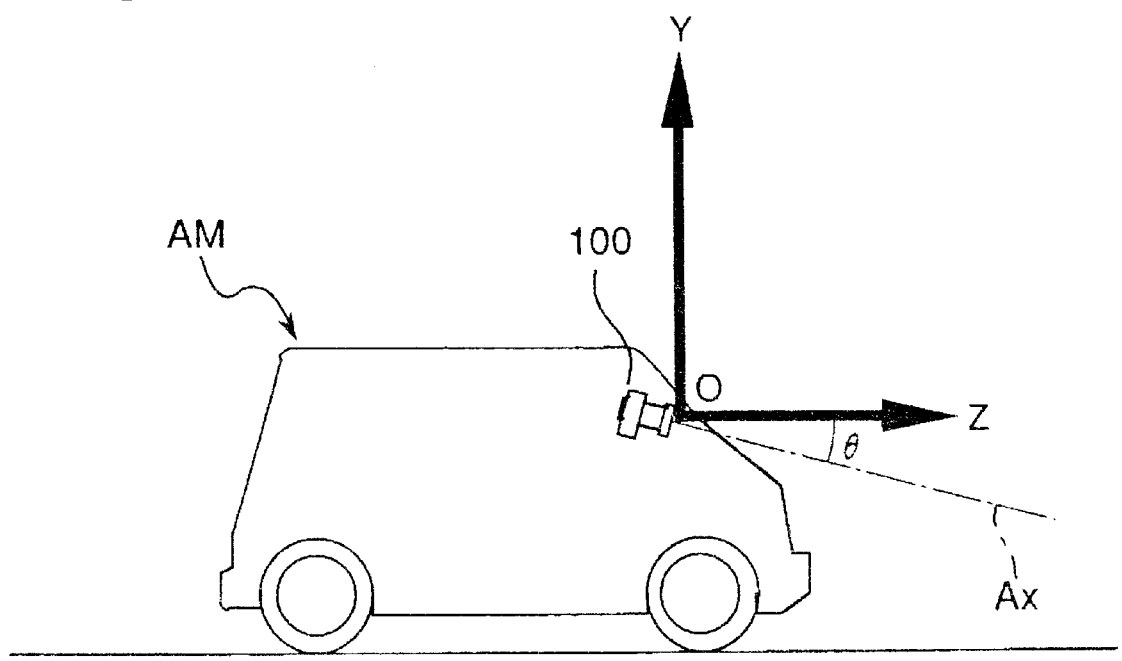
FIG. 4 is used to describe the coordinate system of a birds'-eye image in the present invention.
Figure 5:
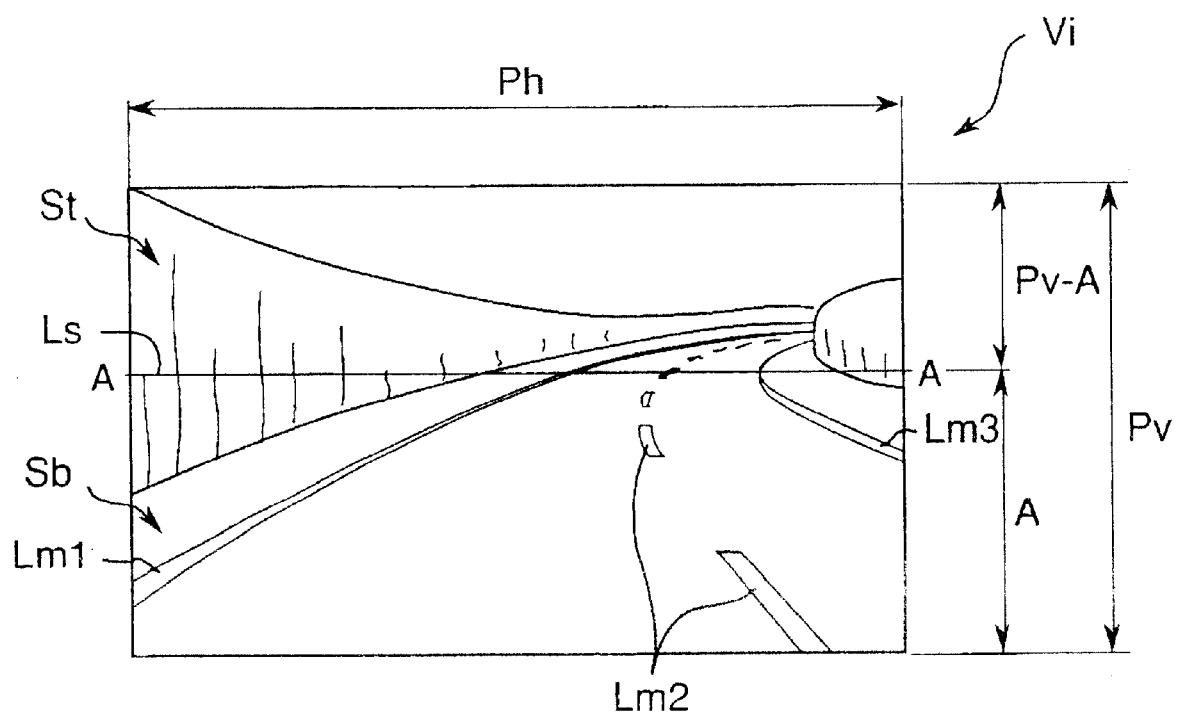
FIG. 5 is a perspective image of the view to the front of the automobile AM that is processed by the local positioning apparatus of the invention.

A simplified side view of an automobile AM in which the digital imaging apparatus 100 of the present invention is installed is shown in FIG. 4. The optical axis Ax of the digital imaging apparatus 100 is aligned with the direction of travel Z of the automobile AM on the road, but is oriented downward from the horizontal by a known number of degrees θ. The view angle of the digital imaging apparatus 100 is also wide enough to capture the road area immediately below and in front of the automobile AM in the perspective image Vi. replace the paragraph at page 18, line 10, with the following rewritten paragraph:

An exemplary perspective image Vi of the forward direction as seen from the automobile AM and represented by the digital image signal Si captured by the digital imaging apparatus 100 is shown in FIG. 5. It is assumed in this image that the automobile AM is travelling in the left lane of a two lane road. The two lanes are defined by the three lane markers Lm1, Lm2, and Lm3. More specifically, the right lane is delineated by lane markers Lm3 and Lm2, and the left lane by lane markers Lm2 and Lm1. The lane markers are commonly applied using a high visibility paint such as white or yellow. In the image shown in FIG. 5 the area at the bottom of the perspective image Vi is an image of the road surface directly below the front of the automobile AM.

It should also be noted that the perspective image Vi captured by the digital imaging apparatus 100 is a typical video image containing pixels of varying luminance, density, and hue, and that line drawing representations appearing as simple contour lines of objects in the viewing area are used in FIG. 5 because of simple drawing limitations.

The preferred embodiments of the present invention are described next below with reference to the accompanying figures.

First Embodiment

Figure 2:
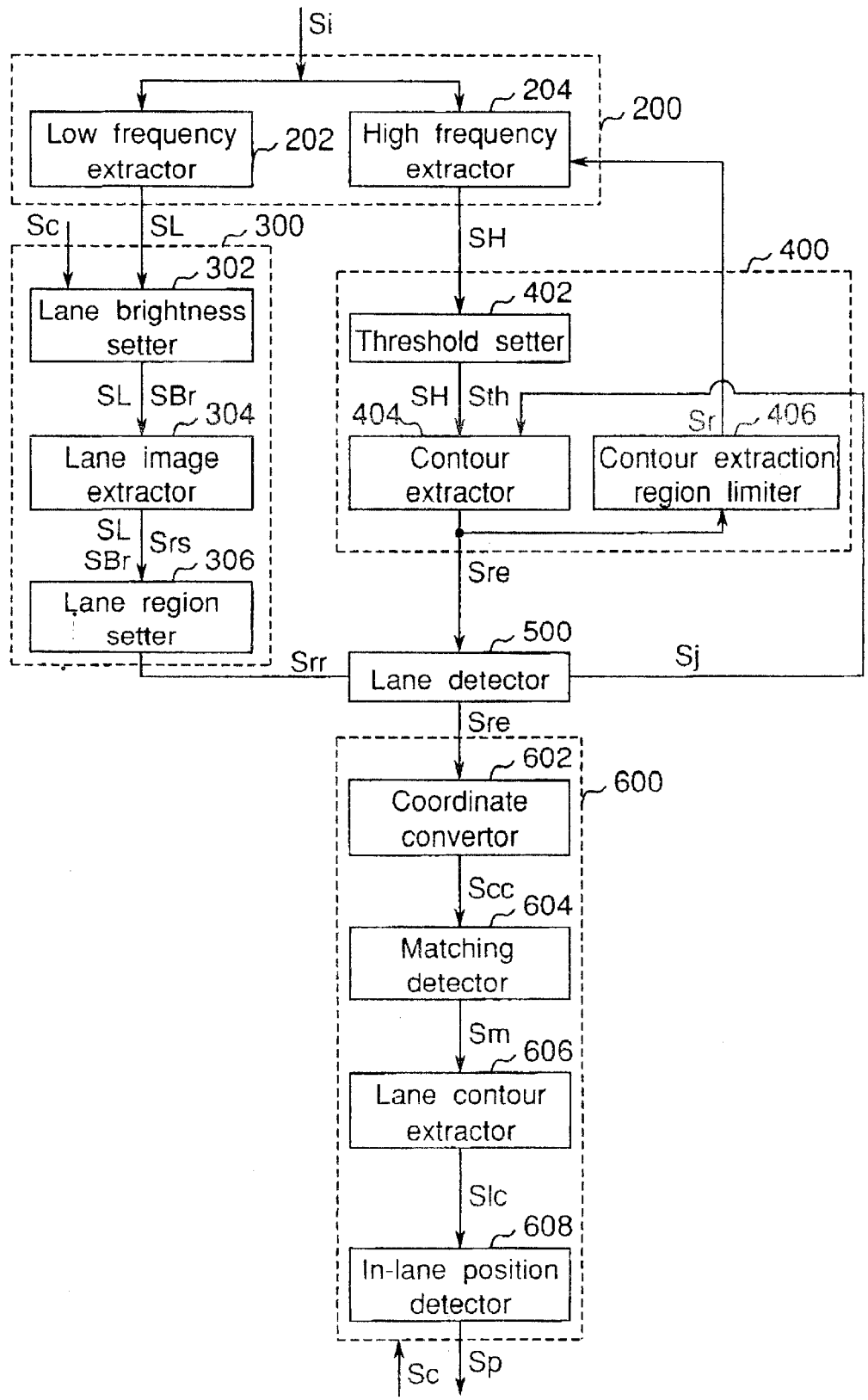
FIG. 2 is a detailed block diagram of essential components of a local positioning apparatus shown in FIG. 1.

FIG. 2 is a detailed block diagram of the spatial frequency separator 200, lane area detector 300, lane contour detector 400, lane detector 500, and local position detector 600. of the digital imaging apparatus 100 shown in FIG. 1.

The spatial frequency separator 200 comprises a low frequency extractor 202 for extracting the low frequency component of the digital image signal Si and generating a low spatial frequency signal SL, and a high frequency extractor 204 for extracting the high frequency component and generating a high spatial frequency signal SH.

The low frequency extractor 202 uses the luminance data of the digital image signal Si to generate an image VL of the low spatial frequency component only, and in an exemplary embodiment of the invention a two-dimensional low pass filter.

The high frequency extractor 204 similarly uses the luminance data of the digital image signal Si to generate an image VH of the high spatial frequency component only, and in an exemplary embodiment of the invention a two-dimensional high pass filter.

More specifically, the low frequency extractor 202 and high frequency extractor 204 separate the perspective image Vi captured by the digital imaging apparatus 100 into a low frequency image VL and a high frequency image VH such that there is no overlap in the frequency components of the images.

The road area detector 300 comprises a lane brightness setter 302, a lane image extractor 304, and a lane region setter 306. The lane area detector 300 is upstream of the lane detector 500, which relies on a region determined by the area detector 300 and a contour extracted by contour detector 400. In this sense, it maybe more appropriate for the area detector 300 to be a road surface area detector and each of the internal components thereof to be road surface devices. It makes more sense for the lane contour detector 400 to be a "road contour detector" for contrast with the lane contour extractor 606. Hereinafter, uniformly used are the following terms: road area detector 300, road brightness setter 302, road image extractor 304, road region setter 306.

The road brightness setter 302 is connected to the low frequency extractor 202 of the spatial frequency separator 200, and to the ECU 700, and receives respectively therefrom the low spatial frequency signal SL and the vehicle condition signal Sc. Based on the velocity signal Sv component of the vehicle condition signal Sc, the road brightness setter 302 sets road brightness levels Bmin and Bmax, which define the luminance levels of the pixels in the area of the road in the low spatial frequency signal SL, and outputs a road brightness signal SBr indicative of the threshold luminance together with the low spatial frequency signal SL.

Based on the low spatial frequency signal SL and road brightness signal SBr (Bmax) supplied from the road brightness setter 302, the road image extractor 304 extracts the road region of the low spatial frequency signal SL, and generates a road extraction signal Srs. The road image extractor 304 thus supplies the low spatial frequency signal SL, road brightness signal SBr, and road extraction signal srs to the road region setter 306.

The road region setter 306 then determines what part of the low spatial frequency signal SL represents the region in which the road is located based on the road extraction signal Srs, and thereby generates the road region signal Srr supplied to the lane detector 500.

The lane contour detector 400 comprises a threshold setter 402, contour extractor 404, and contour extraction region limiter 406. Connected to the high frequency extractor 204 of the spatial frequency separator 200, the threshold setter 402 sets the threshold value Eth extracted by edge detection processing the contour points of the image representing the road in the high spatial frequency signal SH, and outputs a contour threshold signal Sth indicative of these threshold values Eth with the high spatial frequency signal SH.

Based on the contour threshold signal Sth, the contour extractor 404 extracts the contour of the road image in the high spatial frequency signal SH, and thus generates the road contour signal Sre supplied to the lane detector 500 and to the contour extraction region limiter 406.

Based on the road contour signal Sre, the contour extraction region limiter 406 produces a region limiting signal Sr restricting the region in the high spatial frequency signal SH to be used for road contour extraction, and feeds this region limiting signal Sr back to the high frequency extractor 204 of the spatial frequency separator 200.

The high frequency extractor 204 thus extracts the high frequency component and generates the high spatial frequency signal SH from an area in the digital image signal Si restricted by the region limiting signal Sr.

The contour extractor 404 further receives a road judgement signal Sj as feedback from the lane detector 500. If the road contour signal Sre is determined by the lane detector 500 to not represent the true contours of the lane or road, the road contour signal Sre is updated to use the contour edge adjacent to the contour line currently extracted as the lane contour as the updated contour line, and this updated road contour signal Sre is then output to the lane detector 500.

The lane detector 500 thus determines whether the road contour signal Sre represents the correct road contour edge based on the road region signal Srr, and generates a road judgement signal Sj. In the exemplary embodiment of a lane detector 500 described herein, the road judgement signal Sj is preferably high when the correct road contour edge is extracted, and is otherwise low. In other words, when the road judgement signal Sj is low, the lane detector 500 stops outputting the road contour signal Sre, and causes the contour extractor 404 to update the road contour signal Sre. As a result, the lane detector 500 outputs the road contour signal Sre to the local position detector 600 only when the road judgement signal Sj is high.

More specifically, therefore, the contour extractor 404 detects a series of projected contour points representing candidates for the actual lane markers on the road using the high spatial frequency signal SH from the high frequency extractor 204. This series of projected contour points is output to the lane detector 500 as the road contour signal Sre. Using the road region data (i.e., the road region signal Srr) detected by the road image extractor 304, and the projected contour points (i.e., the road contour signal Sre) detected by the contour extractor 404, the lane detector 500 then detects the contour points of the lane markers.

The local position detector 600 comprises a coordinate convertor 602, matching detector 604, lane contour extractor 606, and in-lane position detector 608.

The coordinate convertor 602 converts the front perspective image Vi to a birds'-eye image Vcc by applying a coordinate conversion process to the road contour signal Sre, and thus produces a birds'-eye contour signal Scc.

Based on the birds'-eye contour signal Scc supplied from the coordinate convertor 602, the matching detector 604 then detects whether the road surface for which a contour was detected is straight or curved to output a matching signal Sm indicative of the matched road shape.

Based on the matching signal Sm input from the matching detector 604, the lane contour extractor 606 extracts a contour of the lane currently occupied by the automobile AM to generate a lane contour signal Slc.

Next, based on the lane contour signal Slc input from the lane contour extractor 606 and the vehicle condition signal Sc supplied from the ECU 700, the in-lane position detector 608 detects the position of the automobile AM within the occupied lane to generate the position detection signal Sp output therefrom to the ECU 700.

Note that the local position detector 600 generates the position detection signal Sp using a match detection operation based, in part, on the vehicle condition signal Sc supplied from the ECU 700. In an exemplary embodiment of the present invention as described further below with reference to FIGS. 20 to 22, the match detection operation of the matching detector 604 uses the steering signal SsT component of the vehicle condition signal Sc. The invention shall not be so limited, however, and other methods can be alternatively used.

The operation of the essential parts of a local positioning apparatus LP according to a preferred embodiment of the present invention is described next below with reference to the accompanying FIGS. 5 through 25. The operation of the digital imaging apparatus 100 has already been described above with reference to FIG. 5. The next step is therefore to describe the edge extraction operation of the high. frequency extractor 204 of the spatial frequency separator 200 with reference to FIGS. 5 and 6.

As described above, the high frequency extractor 204 extracts the high frequency component of the digital image signal Si by applying a Sobel filter or other filtering process to the digital image signal Si. This filtering operation detects the edge pixels where there is a sudden change in pixel density. The extractor 204 then generates a high spatial frequency signal SH representing an edge image Vh. To reduce the amount of data that must be filtered for this extraction, the filtering operation is limited to a specifically limited part of the perspective image Vi. It is therefore possible to more quickly detect the perspective image edge Vh data, and generate the high spatial frequency signal SH.

More specifically, the perspective image Vi (FIG. 5) is divided into two parts, a top region St and a bottom region Sb, using a single horizontal line Ls. Note that the horizontal line Ls is aligned to the A-th vertical pixel counted from the bottom of the image. The area of the top region St is therefore $Ph \times (PV-A)$ pixels, and the area of the bottom region Sb is $Ph \times A$ pixels. The vertical position of this A-th pixel is preferably set to match the horizontal position of the vanishing point of perspective image Vi when the perspective image Vi is captured with the automobile AM on a level road. In the exemplary embodiment of the invention, pixel A is set to the vertical position of a pixel representing an image positioned approximately fifty meters away from the automobile AM when the perspective image Vi is captured directly by the digital imaging apparatus 100.

Immediately after the local positioning operation of the present invention is started, the high frequency extractor 204 applies the above high spatial frequency component extraction (filtering) operation to the bottom region Sb only to extract the edge pixels only from and generate the high spatial frequency signal SH only for the bottom region Sb. This obviously means that the high spatial frequency signal SH only contains edge pixels extracted from the bottom region Sb of $Ph \times A$ pixels.

Figure 6:
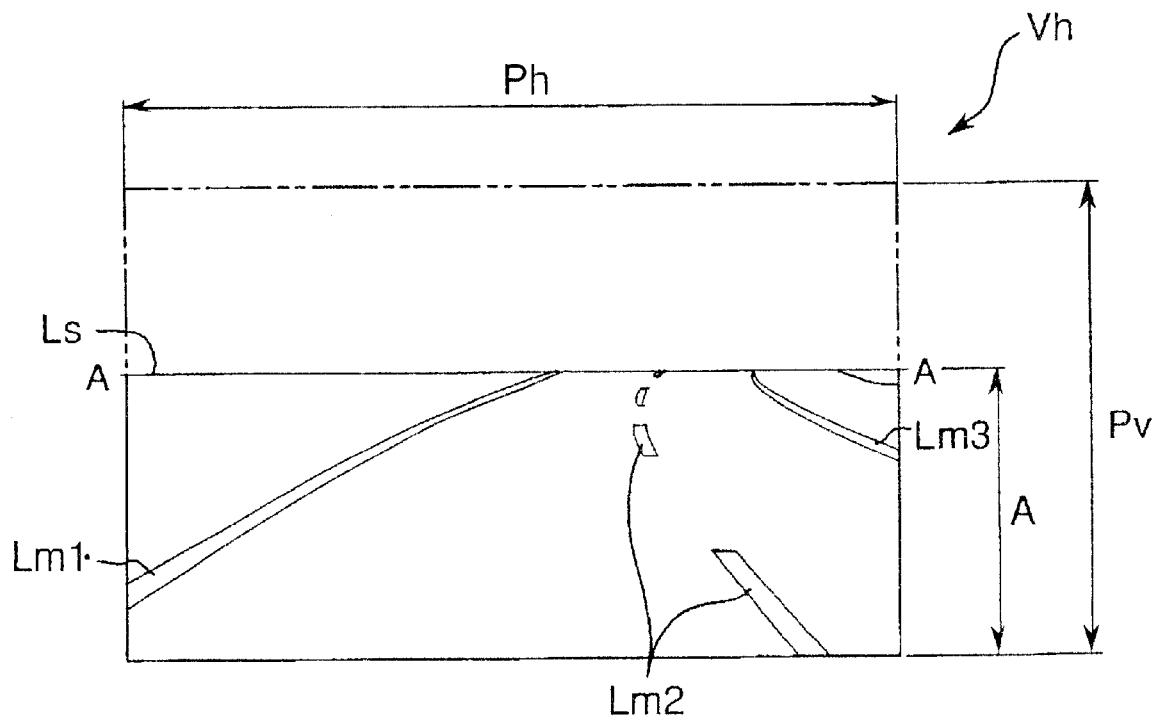
FIG. 6 shows the edges extracted from the perspective image in FIG. 5.

The extracted edge image Vh represented by the high spatial frequency signal SH is shown in FIG. 6. The edge pixels of, and primarily near, the lane markers Lm1, Lm2, and Lm3 are extracted from the bottom region Sb of the perspective image Vi (FIG. 5) as the edge pixels. Though not shown in FIG. 6, it should be obvious that edge pixels from objects unrelated to the lane markers are also extracted.

The threshold setter 402 thus receives the high spatial frequency signal SH comprising the extracted edge pixels from the low frequency extractor 202, and calculates the threshold value Eth for effectively extracting the edge pixels from the contours of the lane markers Lm in the high spatial frequency signal SH using the following equation (1).

$$Eth = C^*Emax + (1-C)^*Emean \quad (1)$$

where Emax and Emean are the maximum density and the mean density values of the pixels on a particular horizontal line in the bottom region Sb of the perspective image Vi; and C is a constant where $0 < C < 1$.

Figure 7:
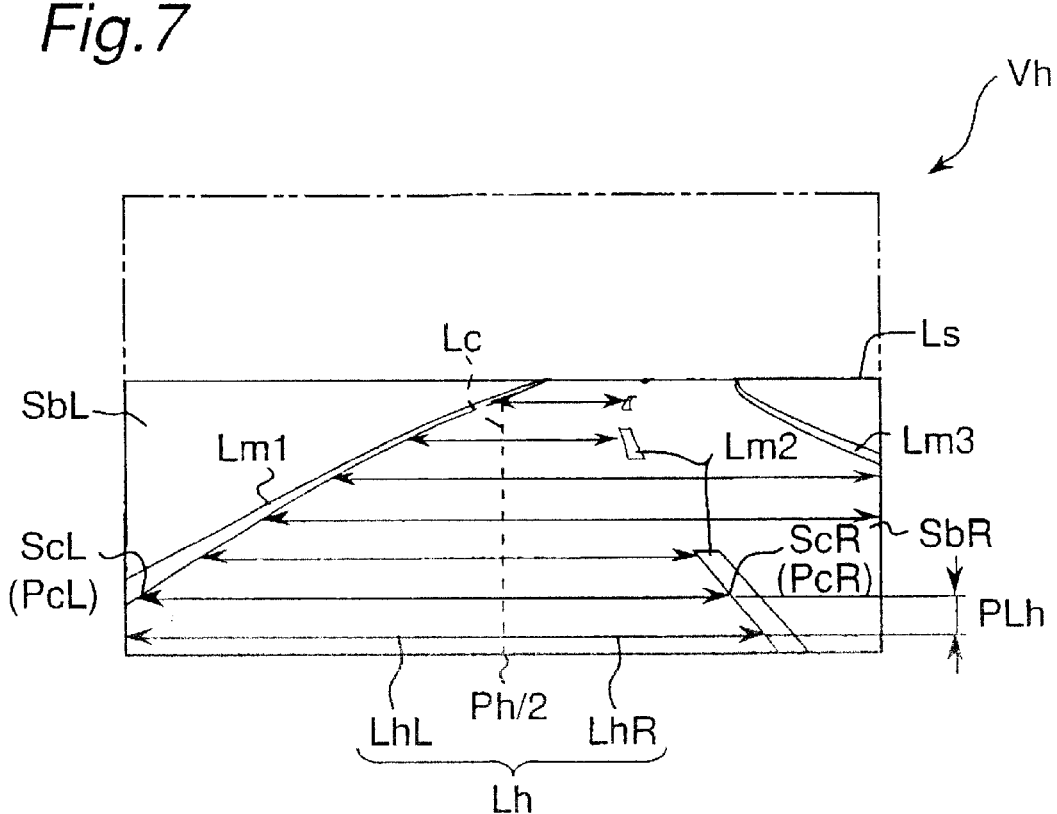
FIG. 7 is used to described a method of extracting contours from the edge image in FIG. 5.

The contour extraction method of the contour extractor 404 is described next referring to FIGS. 7 and 8. An edge image Vh (SH) from which the contour extractor 404 detects contour lines is shown in FIG. 7.

The contour extractor 404 scans the pixels in the bottom region Sb of the high spatial frequency signal SH using the threshold value Eth to extract the contour lines of the displayed lanes. This bottom region Sb is further divided into left and right bottom regions SbL and SbR by a vertical center line Lc. Note that the vertical center line Lc rises vertically from pixel Ph/2 on the bottom line of the image in this exemplary embodiment, but the invention shall not be so limited.

The contour extractor 404 compares the density of each pixel in the scanning area with the threshold value Eth, and extracts those pixels with a pixel density greater than or equal to the threshold value Eth as a contour pixel. The scanning order for this operation follows horizontal line Ls and works to the left and right of the vertical center line Lc along left and right horizontal lines LhL and LhR. After scanning along horizontal line Ls, the contour extractor 404 drops down a particular number of pixels along the vertical center line Lc, and again scans to right and left to obtain the contour pixels on that horizontal line.

In exemplary practice, however, the contour extractor 404 scans first to the left or the right of the center line in the bottom region Sb to obtain the contour pixels on that side. For example, if the left side of the bottom region Sb is scanned first, the contour extractor 404 scans top to bottom starting from horizontal line Ls at pixel A, scanning lines at an interval of PLh pixels downward to the bottom of the image, and scanning every pixel right to left from the vertical center line Lc along the left horizontal line LhL. After obtaining all contour pixels on the bottom left sector of the image in this sequence, the contour extractor 404 then returns to the top horizontal line Ls to similarly scan the bottom right sector of the image in left to right sequence from the vertical center line Lc and obtain the contour pixels therein.

Skipping the horizontal scanning position at a particular interval PLh results in extraction from an integer K number of horizontal lines Lh equivalent to the absolute value of Pv/PLh. This reduces the number of calculations to be performed, and thereby increases the speed of contour pixel extraction. Note that the value of PLh is a natural number set in a pixel unit increment.

When the first pixel with a particular density value is found on left or right horizontal lines LhL and LhR at a given vertical position, that pixel Pe is defined as a contour pixel, and contour pixel scanning for that horizontal line is skipped. Scanning then advances directly to the next horizontal line PLh pixels down.

In other words, contour pixels are detected at the inside edges of the lane markers Lm1 and Lm2 on the left and right sides of the shown lane at the first horizontal line Lh counted down from the horizontal line Ls, as shown in FIG. 7. At the third and fourth lines, however, there is a gap between successive lane markers Lm2 dividing the right and left lanes, and contour pixel detection to the right side of the vertical center line Lc at these lines, or more specifically, at any vertical position between these lane markers Lm2, will fail to detect a contour pixel from any lane marker Lm2 and may detect a contour pixel from the lane marker Lm3 at the edge of the adjacent lane. The edges of markings other than the lane markers but causing a similar sudden change in pixel density, e.g., soil or even imaging flaws, will also be detected as contour pixels. Such contour pixels are, however, irrelevant to detecting the vehicle lanes, and are therefore simply a noise component insofar as the position detection operation of the present invention is concerned. As a result, these noise components are removed by the lane detector 500 as described in further detail below.

Figure 8:
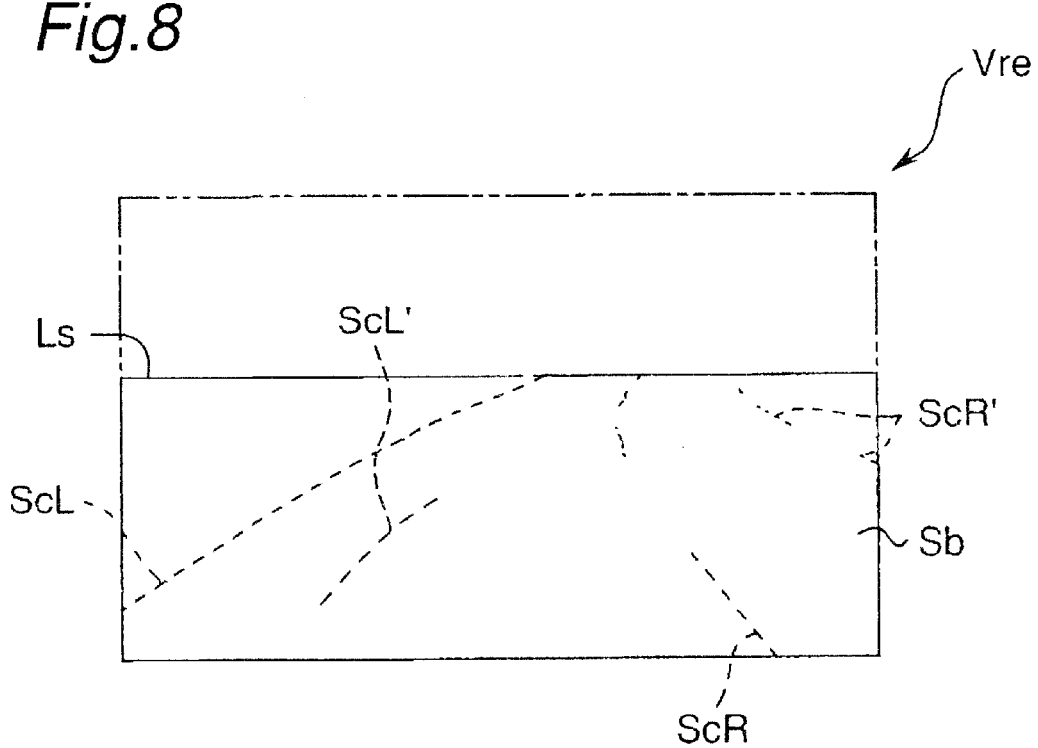
FIG. 8 shows the contour lines extracted from the edge image in FIG. 5.

An extracted contour image Vre represented by the road contour signal Sre obtained as described above from the image in FIG. 7 is shown in FIG. 8. The detected contour pixels of the lane markers Lm1, Lm2, and Lm3 are shown as contour signals ScL, ScR, and ScR' where ScR' is noise data. Contour pixel signal ScL' represents noise data extracted due to some other flaw, shadow, or marking apparent in the image.

Figure 9:
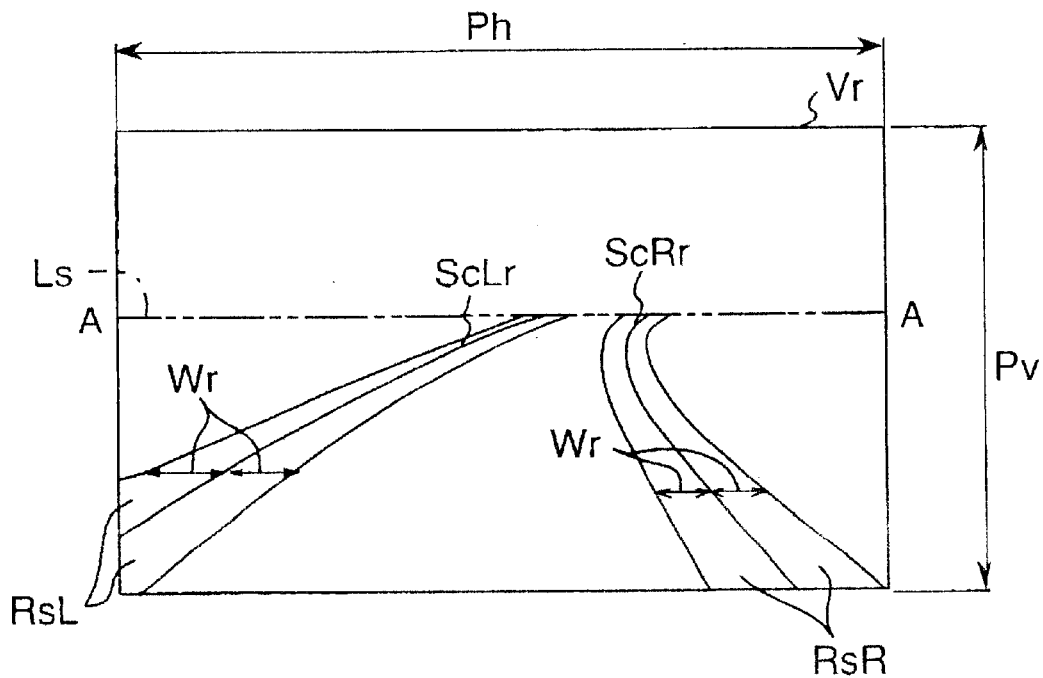
FIG. 9 is used to describe how the processing region of the perspective image is limited by the contour extraction region limiter in FIG. 2.

The method of limiting the detection area by means of the contour extraction region limiter 406 is described next below with reference to FIGS. 9 and 10. As shown in FIG. 9, the contour extraction region limiter 406 defines a limited region RsL and RsR of a known width Wr to the right and left sides of the extracted contour signals ScL and ScR based on the road contour signal Sre. The region limiting signal Sr identifies these limited regions RsL and RsR, and is output to the high frequency extractor 204 of the spatial frequency separator 200. However, when the contour extractor 404 is unable to extract the lane contour and an error signal See (not shown in the figures) in place of the road contour signal Sre, the extraction region is not limited.

The width Wr of the limited region is determined with respect to the amount of movement in the x-axis (horizontal) direction of the lane markers in the image as a result of lateral movement of the automobile AM. More specifically, Wr is the distance that lane marker Lm1 can move in the perspective image Vi in one system cycle, i.e., 33 mS in an exemplary embodiment of the invention. It therefore follows that the limit width Wr increases towards the bottom of the image.

Figure 10:
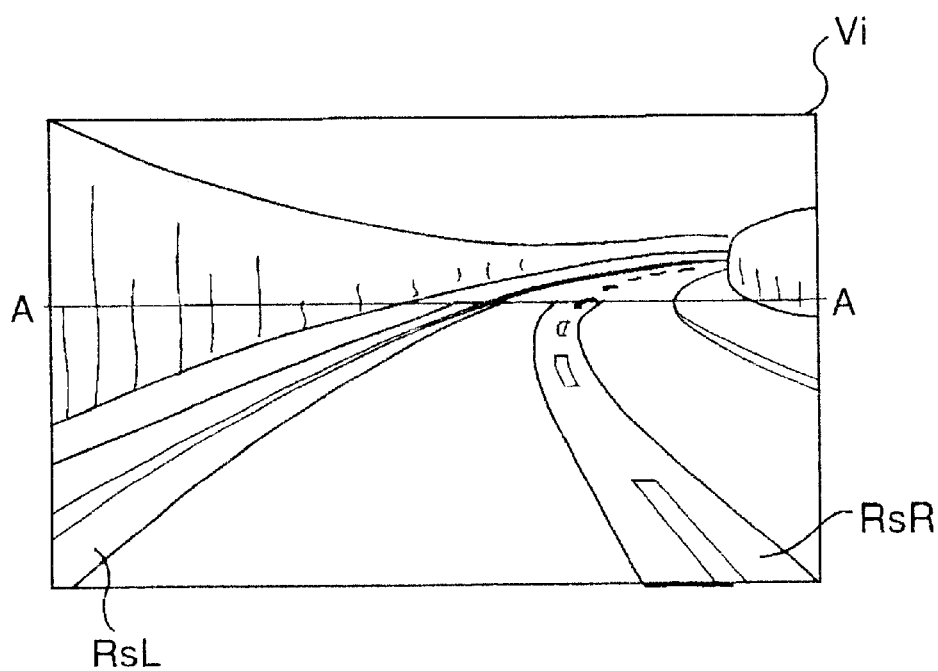
FIG. 10 is used to describe a perspective image after region limited by the method shown in 9.

As shown in FIG. 10, the high frequency extractor 204 limits the area for edge extraction in the bottom region Sb of the perspective image Vi to the limited regions RsR and RsL based on the region limiting signal Sr. In addition to reducing the amount of data to be processed and therefore increasing the processing speed, this process also suppresses noise components from outside the lane contours, and therefore improves the lane tracking ability.

When a noise component is sufficiently removed from the limited regions RsR and RsL, as is the contour line Scr' of the opposing lane marker Lm3 described above, the noise component is removed by the contour extraction region limiter 406. However, when a contour noise component is near a lane contour, as is the contour line ScL' in FIG. 8, the noise component will be within the limited region Rsr. In this case the noise component cannot be removed by the contour extraction region limiter 406. As a result, these noise components must be removed by the lane detector 500, as will be described later below.

Figure 11:
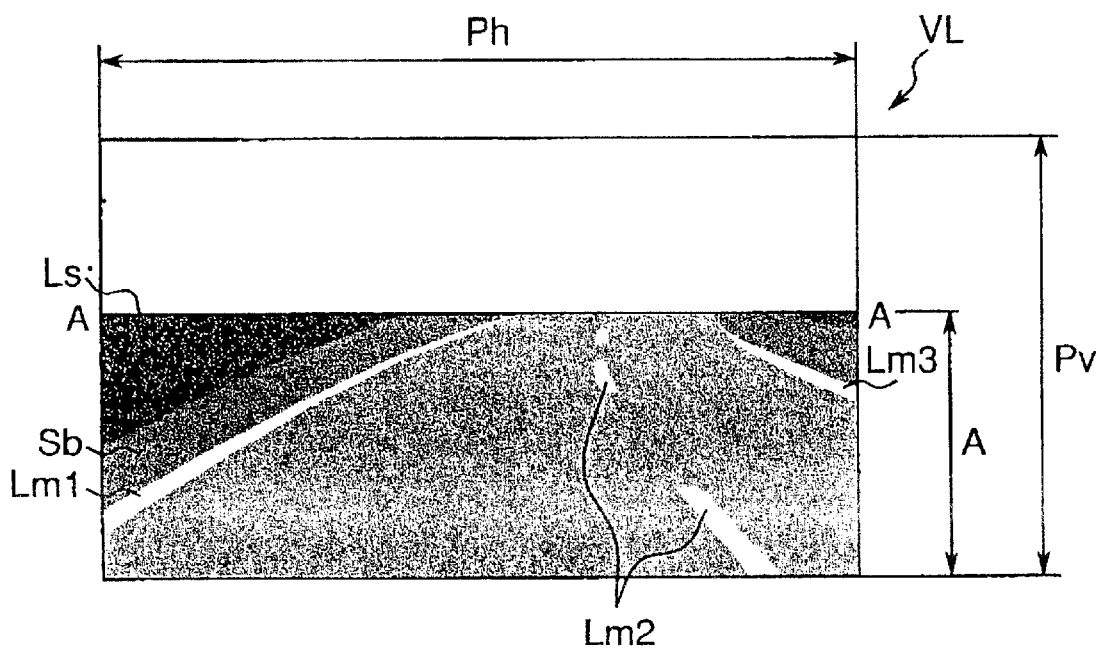
FIG. 11 is used to describe the luminance image extracted from the front perspective image shown in FIG. 5.

The method of generating a low spatial frequency image by means of the low frequency extractor 202 of the spatial frequency separator 200 is described next below with reference to FIG. 11.

The low frequency extractor 202 generates the low spatial frequency signal SL by low-pass filtering the digital image signal Si. The subject of the perspective image Vi appears as a fuzzy grouping of pixels of various luminance levels in the low frequency image VL represented by the low spatial frequency signal SL. The low frequency image VL represented by the low spatial frequency signal SL is thus a luminance image. To reduce the processing load of the low spatial frequency signal SL generating operation, the luminance pixels are therefore extracted from a limited part of the perspective image Vi, specifically, the Ph×A pixel bottom region Sb. This is similar to the method of generating the high spatial frequency signal SH described above.

The luminance of the pixels in the road region of the low frequency image VL tends to increase with the distance from the automobile AM, i.e., the distance from the digital imaging apparatus 100. The same is true of the luminance level of pixels in image areas corresponding to the road shoulder, drainage channels, and guard rails. In the image in FIG. 11, the pixels at vertical pixel level A, i.e., along horizontal line Ls, have the highest luminance level of any pixels associated with the same object, and the pixels toward the bottom of the image have the lowest luminance level.

The luminance level of pixels at the same vertical height but associated with different objects will, however, vary from object to object. More specifically, the luminance will vary according to the reflectance of the subject material, and the angle of incidence of light from the light source. The above described relationship between luminance and distance, i.e., that luminance increases with distance, is, however, retained.

The low frequency image VL is thus produced only from the bottom region Sb of the perspective image Vi obtained by the digital imaging apparatus 100 imaging primarily the area directly in front of the vehicle. Furthermore, a majority of the pixels in the low frequency image VL represent the road surface, and this tendency is therefore substantially applicable to all pixels in the low frequency image VL. The pixels for the road surface detected along the horizontal line Ls at the farthest point from the digital imaging apparatus 100 in the low frequency image VL are therefore defined as tie farthest road pixels Pf, and the luminance level of those pixels is defined as maximum luminance Bmax. The pixels for the road surface detected at the bottom of the image nearest the digital imaging apparatus 100 in the low frequency image VL are therefore defined as the nearest road pixels Pn, and the luminance level of those pixels as minimum luminance Bmin.

Note that the location of the farthest road pixels Pf and nearest road pixels Pn can be freely set as required.

Figure 12:
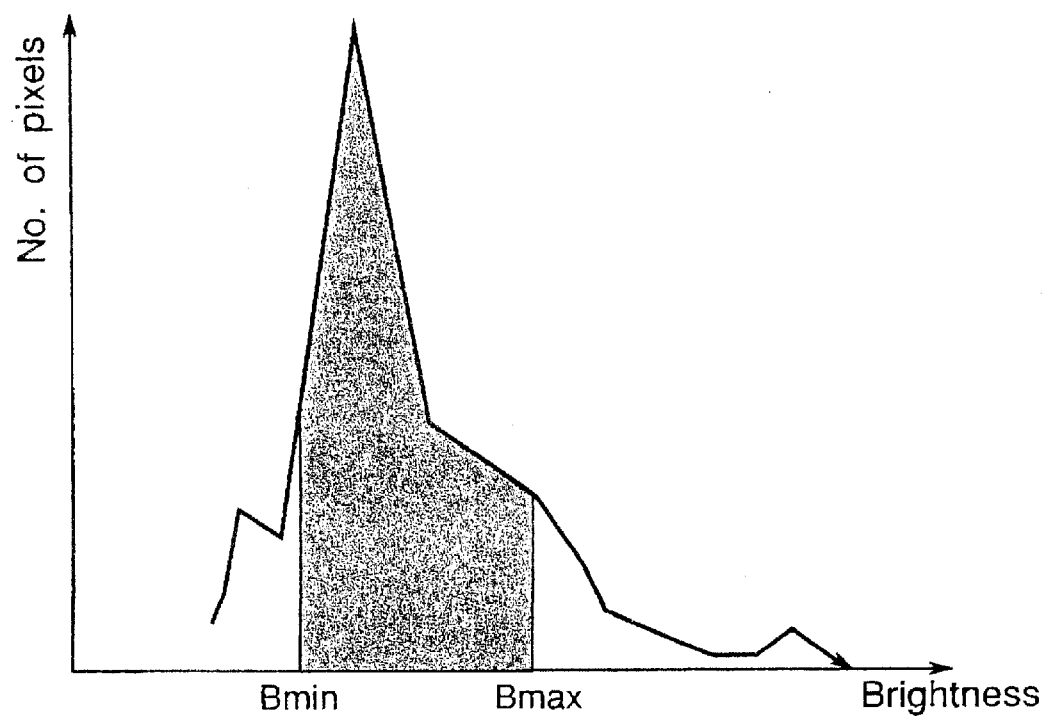
FIG. 12 is a graph of the relationship between pixel luminance in the luminance image in FIG. 11 and the pixel count having a particular luminance value.

A histogram of all pixels in the low frequency image VL is shown in FIG. 12 with luminance levels plotted on the horizontal axis and the number of pixels with a given luminance level plotted on the vertical axis. As will be known from FIG. 12, a majority of the pixels in the low frequency image VL are road surface pixels with luminance between minimum luminance Bmin and maximum luminance Bmax. The luminance range between minimum luminance Bmin and maximum luminance Bmax is therefore called the road luminance range Br, and the pixels in this road luminance range Br are called road pixels Pr.

When the digital imaging apparatus 100 is installed at substantially the front center of the automobile AM as described with reference to FIG. 4, the positions of the farthest road pixels Pf and nearest road pixels Pn are set at appropriate vertical positions Vpf and Vpn in the image on the vertical center line Lc. The road surface occupying the area between Vpf and Vpn is then indicated by the road pixels Pr. The position of Vpf can therefore be thought of as the farthest distance at which the road surface is detected, and the position of Vpn as the nearest distance at which the road surface is detected.

The position of the farthest road pixels Pf is set appropriately on the farthest road detection distance Vpf according to the position at which the digital imaging apparatus 100 is mounted on the automobile AM, and the position of the nearest road pixels Pn is likewise set appropriately on the nearest road detection distance Vpn.

The farthest road detection distance Vpf and nearest road detection distance Vpn can be set according to the vehicle speed and the processing capacity (speed) of the local positioning apparatus LP as described further below.

Figure 13:
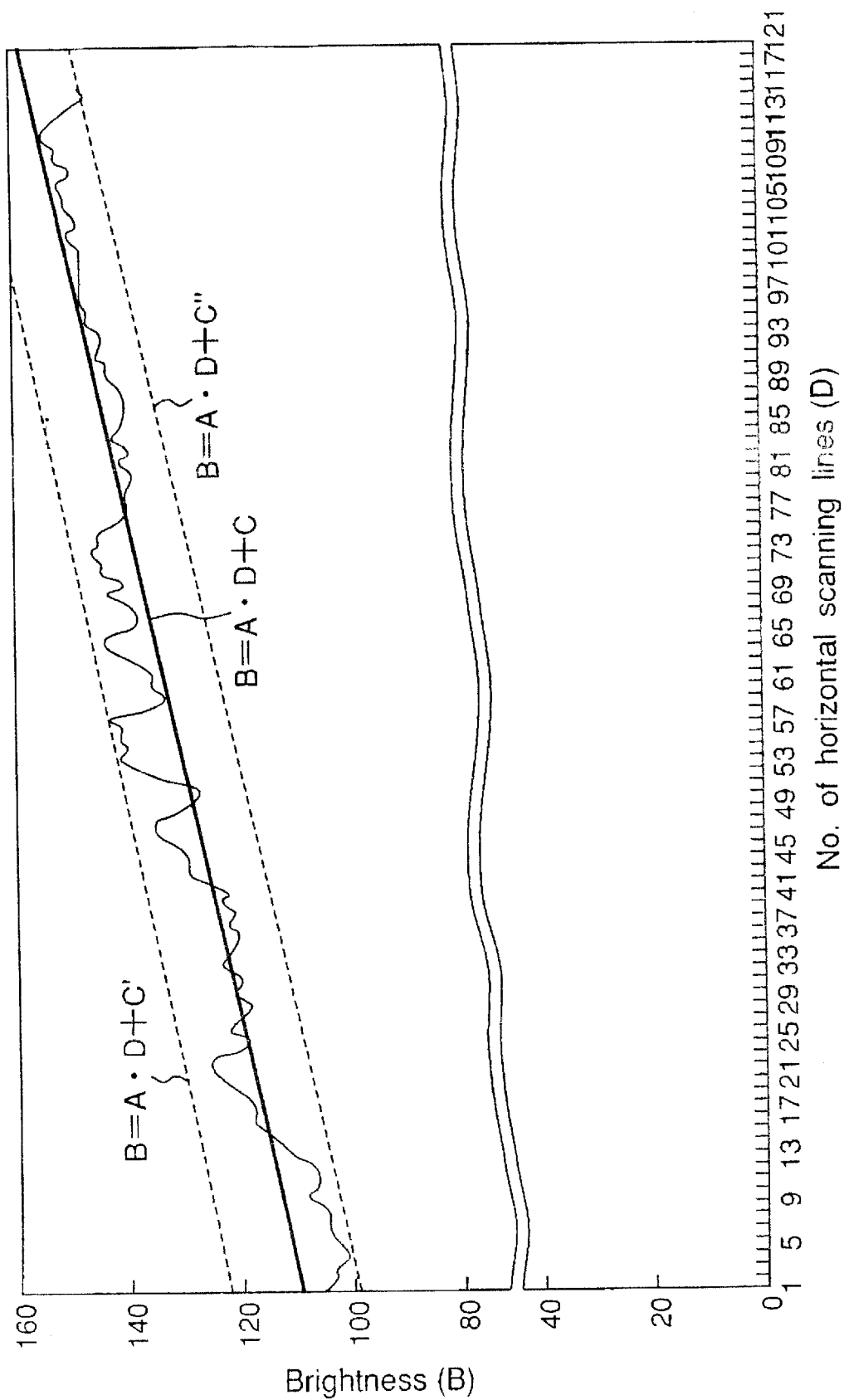
FIG. 13 is a graph of experimental values showing the relationship between the luminance values of pixels in the road area of the luminance image, and the focal distance of the road surface from which the corresponding pixel was captured.

The relationship between the luminance of only road pixels in the low frequency image VL and the distance of the road surface from which the pixels are captured is shown in FIG. 13. The values shown in FIG. 13 are for pixels in an image experimentally obtained while driving on a straight section of highway on a sunny day with the digital imaging apparatus 100 mounted on the front of the automobile AM. The horizontal axis indicates the horizontal scanning position (Pv) in the low frequency image VL, i.e., the relative distance D of each pixel from the digital imaging apparatus 100, and the vertical axis indicates the luminance B at that distance. That the distance—luminance relationship is not a flat line but has a right ascending slope is a result of lane markings, soiling, and color and luminance spots caused by reflectance from obstructions on the road. As already described above, the area represented by a single pixel increases as the horizontal scanning position is elevated, meaning that the scanning position becomes more distant from the image pickup 100. However, the relationship between imaging distance and pixel luminance can be expressed by equation (2) below.

$$B=A*D+C \qquad (2)$$

Note that values of A 0.4128 and D=108.56 have been experimentally obtained on straight lanes of an expressway.

By correctly setting C' and C" so that C'>C>C", and obtaining parallel lines of:

$$B=A*D+C' \qquad (3),$$

and $$B=A*D+C" \qquad (4),$$

above and below the line represented by equation (2), the range of luminance values of pixels at a particular scanning position can be obtained.

Figure 14:
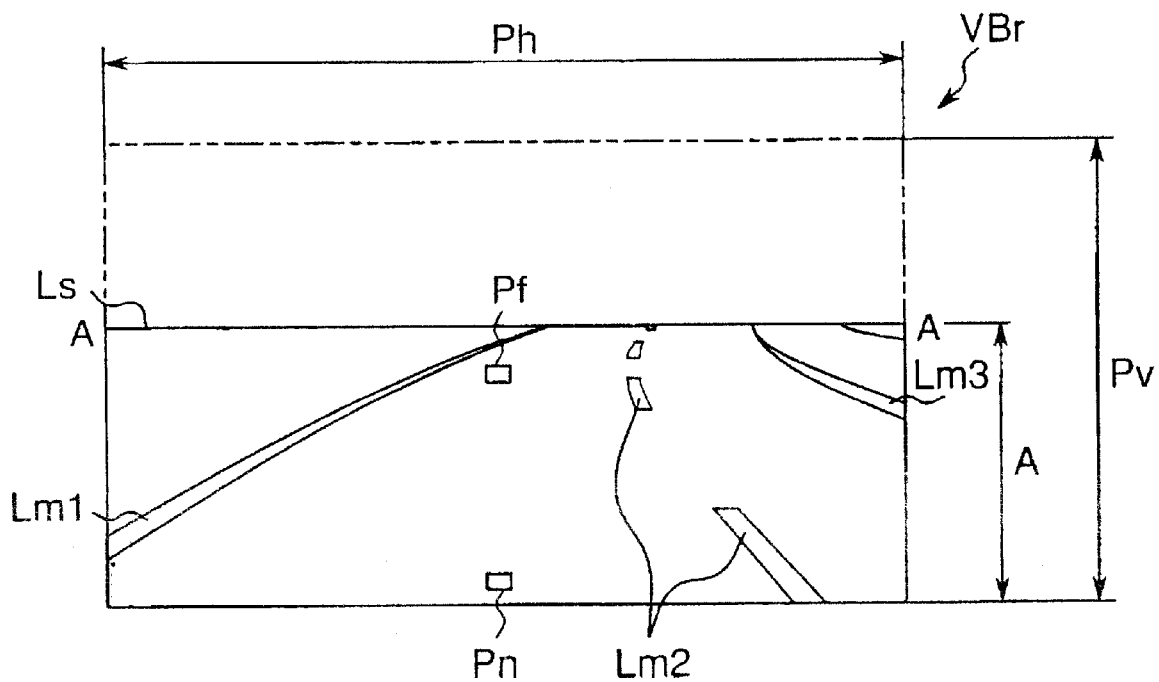
FIG. 14 is used to describe the road brightness setting method of the road brightness setter shown in FIG. 2.

The method whereby the road brightness setter 302 determines the luminance level of the road surface is described next below with reference to FIG. 14. Based on the relationship between the imaging distance and pixel luminance described with reference to FIGS. 11 to 13, the farthest road pixels Pf and nearest road pixels Pn in the low spatial frequency signal SL are set to the pixel positions corresponding to the distance defining the road area to be used for positioning detection. The pixel luminance at the farthest road pixels Pf is then defined as maximum luminance Bmax, and the pixel luminance at the nearest road pixels Pn is defined as the minimum luminance Bmin to generate the road brightness signal SBr. Note that the road brightness signal SBr may be set to have luminance levels in the range defined by equations (3) and (4) above. The locations of the farthest road pixels Pf and the nearest road pixels Pn in the low frequency image VL are expressed as Pf(xPf,yPf) and Pn(xPn,yPn) using the coordinate system shown in FIG. 3.

By setting the position of the farthest road pixels Pf from which the maximum luminance Bmax is detected to an appropriate position according to the processing speed Tp of the local positioning apparatus LP and the speed of the automobile AM, high precision lane detection is possible based on the operating conditions of the automobile AM on which the local positioning apparatus LP is installed.

For example, by moving the farthest road pixels Pf vertically upward in the low frequency image VL according to the velocity signal Sv of the automobile AM, the detection precision at points far from the automobile AM can be maintained even when the automobile AM is travelling at a high rate of speed. When the automobile AM is travelling slowly, lane detection precision can be improved by moving the position of the farthest road pixels Pf closer. Because the vehicle will pass the detection point while the detection process is in progress when the vehicle is travelling fast and the farthest road pixels Pf is close, it is preferable to detect the maximum luminance Bmax at a suitable distance from the vehicle based on the velocity signal Sv and the processing capacity of the local positioning apparatus LP.

When the automobile AM is travelling on a straight road, the farthest road pixels Pf can be set on the vertical center line Lc of the low frequency image VL. However, when the automobile AM is on a curving road, setting the farthest road pixels Pf on the vertical center line Lc may result in the maximum luminance Bmax being extracted from a guard rail or other non-road subject within the low frequency image VL.

In such cases, it is necessary to estimate the curvature of the road from the steering angle of the automobile AM so that only pixels within the image area of the road surface in the low frequency image VL are used for extracting the maximum luminance Bmax. This can be accomplished by moving the farthest road pixels Pf horizontally within the low frequency image VL according to the steering signal Ss so that the farthest road pixels Pf are within the road surface area.

By moving the position of the farthest road pixels Pf freely horizontally and vertically within the low frequency image VL based on the velocity signal Sv and steering signal Ss, the farthest road pixels Pf can be adjusted to the road image area. Note that a value other than the velocity signal Sv can be alternatively used, including a distance value (vertical image position value) entered by the user. Data on the direction of travel (straight or curved) supplied by a navigation system based, for example, on map data, can also be used in place of the steering signal Ss. More specifically, the pixels of the subject area can be reliably captured by moving or fixing the positions of the farthest road pixels Pf and nearest road pixels Pn in the low frequency image VL as necessary.

Figure 15:
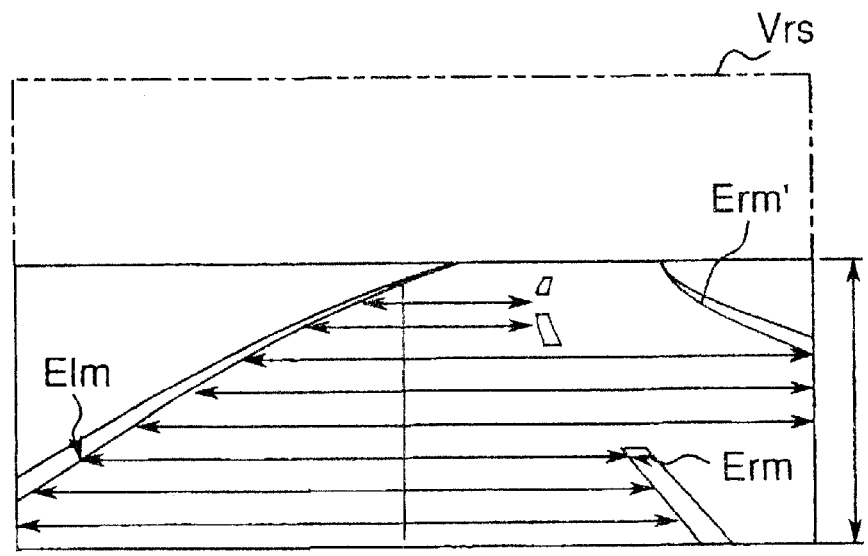
FIG. 15 is used to describe the road area extraction method of the road image extractor in FIG. 2.
Figure 16:
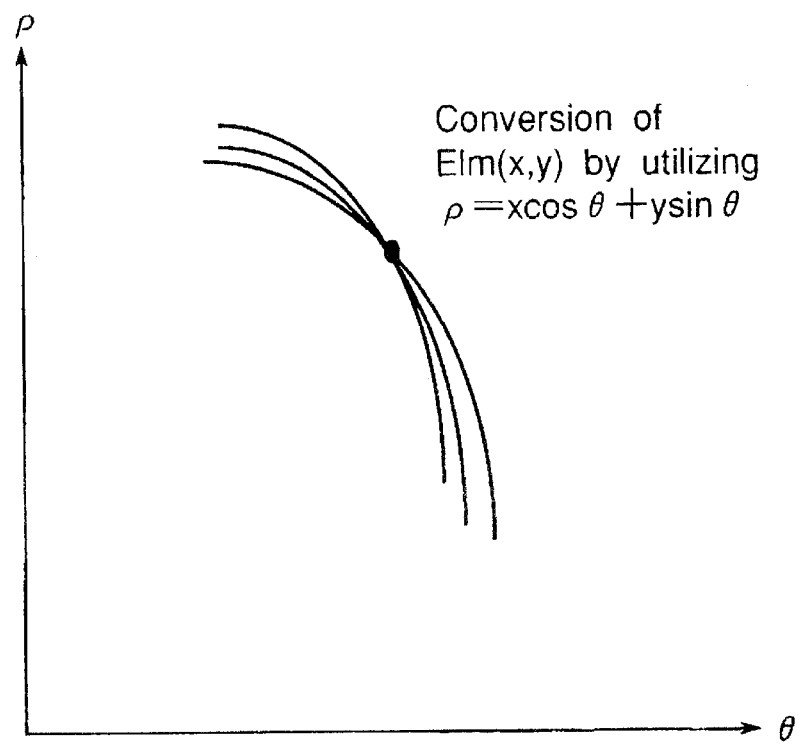
FIG. 16 is used to describe a method of extracting the road area edges from the road area pixels extracted as shown in FIG. 15.
Figure 17:
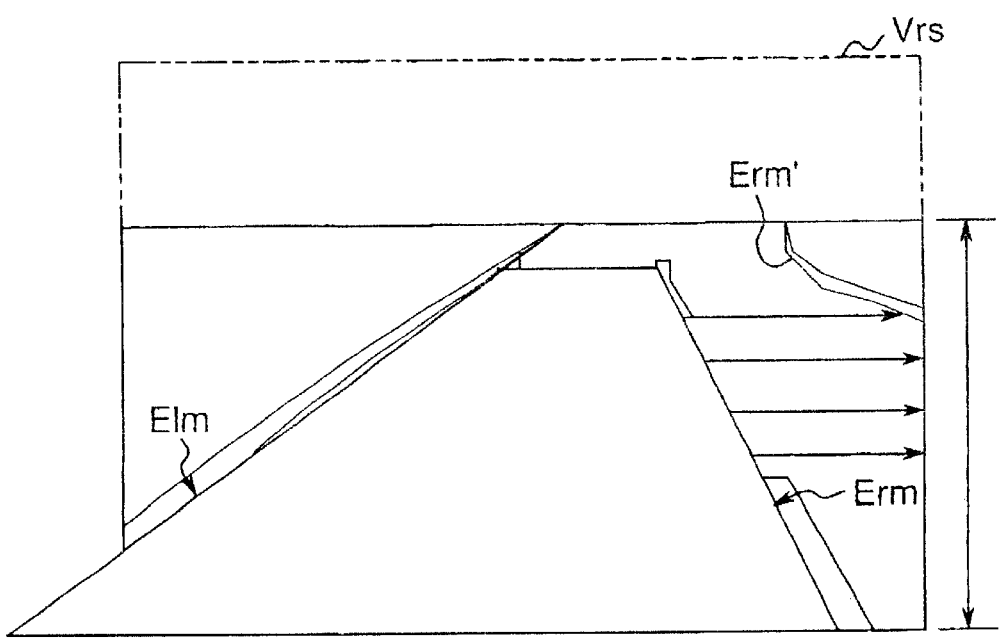
FIG. 17 shows the road image after linear approximation using the method shown in FIG. 16.

The method whereby the road image extractor 304 extracts an image of the road surface is described next below with reference to FIGS. 15 to 17. The road image extractor 304 scans the pixels in the bottom region Sb of the low spatial frequency signal SL based on the pixel luminance relationship to the scanning position shown in FIG. 13 and defined by equations 2, 3, and 4 to extract the pixels in the road image area. The road image contours extracted by the road image extractor 304 are similar to the contour lines of the lanes obtained by the contour extractor 404 and described with reference to FIG. 12. The road image extractor 304, however, extracts the pixels with a luminance level between maximum luminance Bmax and minimum luminance Bmin, i.e., pixels satisfying equations 2, 3, and 4 at each horizontal scanning position Pv, rather than using an edge extraction method as does the contour extractor 404.

Region pixel sets Elm, Erm, and Erm' corresponding to the contour pixels ScL, ScR, and ScR' in FIG. 8 are obtained at the inside circumference part of lane markers Lm1, Lm2, and Lm3. It should be noted that lines representing the inside edges of the lane markers Lm1, Lm2, and Lm3 can be obtained as necessary based on the region pixel sets Elm, Erm, and Erm' using a least squares method or other suitable method such as the Hough conversion described further below with reference to FIGS. 20 and 22. An example of Hough conversion of pixel set Elm is shown in FIG. 16, and an example of a linear approximation of the road surface is shown in FIG. 17. Note that linear approximation effectively removes the inside edge part set Erm' of the lane marker Lm3 of the adjacent lane.

Figure 18:
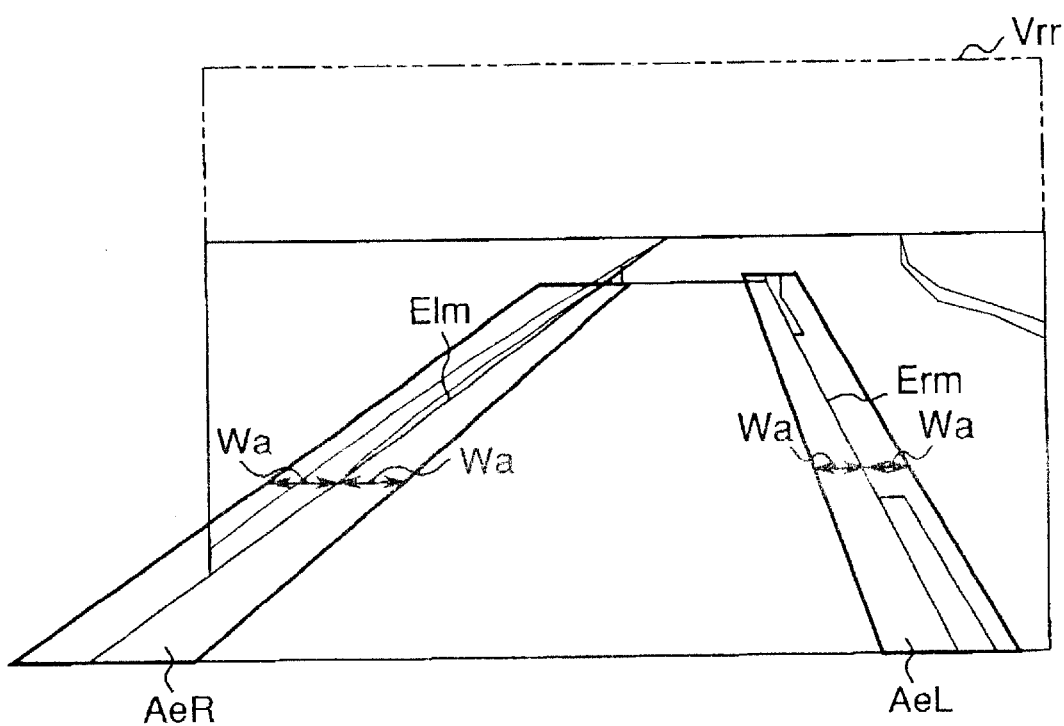
FIG. 18 is used to describe the operation of the road region setter.

The method whereby the road region setter 306 defines the road surface area is described next below with reference to FIG. 18.

The road region setter 306 sets road edge areas AeL and AeR based on the road extraction signal Srs by adding a known horizontal width Wa to both right and left sides of the extracted inside edge areas Elm and Erm. The road region signal Srr output to the lane detector 500 is indicative of these road edge areas AeL and AeR. When the road region setter 306 cannot extract the road area and the error signal See is output in place of the road extraction signal Srs, the road edge areas AeL and AeR are not set. Note that while the operation of the road image extractor 304 is similar to that of the contour extraction region limiter 406, the limit width Wa can be an appropriately defined value based on the values C, C', and C" shown in equations 2 to 4 above.

Using the low spatial frequency signal SL from the low frequency extractor 202, the road image extractor 304 divides the low frequency image, or luminance image, VL into areas of pixels having a particular relationship based on the luminance distribution. Certain road knowledge is then referenced and applied to these divided regions to detect the road area.

The "road knowledge" used herein includes knowing that the area containing the farthest road pixels Pf and nearest road pixels Pn in the perspective image Vi captured by the digital imaging apparatus 100 is within the road area. Other knowledge includes knowing that the vanishing point at which the right and left lane markers intersect does not change suddenly, and that the pixel area of the road surface is substantially constant. The area containing the nearest road pixels Pn and the adjacent area can therefore be defined as the road area.

The operation of the lane detector 500 is described next.

The lane detector 500 determines whether the contour lines ScR and ScL described by the road contour signal Sre from the lane contour detector 400 (FIG. 8) are within the road edge areas AeR and AeL described by the road region signal Srr. To accomplish this the lane detector 500 determines whether the ScR value is within AeR±Wa at the same horizontal scanning line position (distance). If ScR is within this range, the road contour signal Sre is determined to represent a correct road contour. The road judgement signal Sj is therefore output low, and the road contour signal Sre is passed through to the local position detector 600.

However, if ScR is outside the range AeR±Wa, the road contour signal Sre is determined not to represent a correct road contour, but to be within a noise contour component. The road judgement signal Sj is therefore output high, and the road contour signal Sre is not output.

It is therefore possible as described above to produce a low frequency image and a high frequency image with no spatial frequency overlap between the images from the same luminance image data, and separately detect from these images the road area and lane marker contour points. As a result, lane markers can be detected with high precision.

The coordinate conversion principle used by the coordinate convertor 602 to convert the extracted contour image Vre is described briefly below with reference to FIGS. 3 and 4.

As described above, the coordinate convertor 602 converts the coordinate system of the road contour signal Sre to convert the extracted contour image Vre represented by the road contour signal Sre to a birds'-eye image Vcc. However, the perspective representation of objects in the extracted contour image Vre results in shape distortion that increases with the distance from the digital imaging apparatus 100. This means that, for example, when there are two identical objects with one placed at a greater distance from the digital imaging apparatus 100, the farther object will appear smaller than the nearer object. This shape distortion increases with the distance from the digital imaging apparatus 100 or automobile AM.

Figure 3:
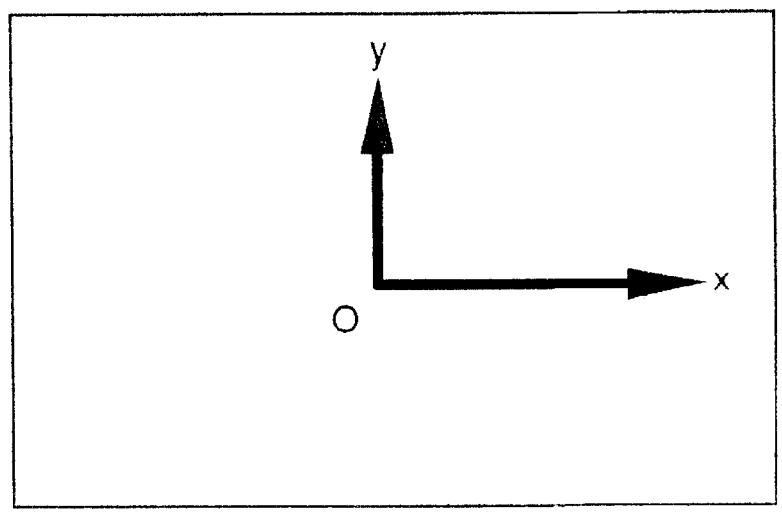
FIG. 3 is used to describe the coordinate system of a perspective image in the present invention.

The coordinate system of perspective images Vi, Vh, and Vre is shown in FIG. 3. The birds'-eye view coordinate system referenced to the automobile AM is shown in FIG. 4. The x-axis of the image coordinate system (x,y) is parallel to and oriented in the same direction as the X-axis in the coordinate system of the birds'-eye image Vcc, and the y-axis is inclined to the Y-axis θ degrees because the optical axis Ax of the digital imaging apparatus 100 is inclined θ degrees from level. The X-axis and Z-axis therefore define a level plane Pd that is parallel to the travelling surface, i.e., road surface, of the automobile AM. The Y-axis and y-axis are aligned, and the X-axis is perpendicular to the surface plane of FIG. 4. The origin O matches the origin of the coordinate system of the extracted contour image Vre. The optical axis Ax of the digital imaging apparatus 100 passes through the origin O.

The coordinates of the extracted contour image Vre can be converted to the coordinates of the birds'-eye image Vcc using the following equations.

$$X=(x/F)(Z \cos \theta - Y \sin \theta) \quad (5),$$

$$Z=Y(F \cos \theta + Y \sin \theta) \quad (6),$$

and $$Y=-H \quad (7),$$

where F is the focal distance of the optical lens of the digital imaging apparatus 100; θ is the angle between the Z-axis (horizontal axis) and the optical axis Ax of the lens; and H is the distance from the road surface to the origin of the optical axis of optical lens. The values of θ and H are preferably set to obtain a perspective image Vi of the area to the front of the automobile AM as described with reference to FIG. 5. In an exemplary embodiment of the present invention, θ is 6 degrees, and H is 1.2 meters.

The birds'-eye contour signal Scc is then obtained by converting the coordinates of the road contour signal Sre by converting the distances in the extracted contour image Vre using the above equations 5 to 7. Horizontal distances in this birds'-eye contour signal Scc are accurately represented irrespective of the Z-axis direction from the digital imaging apparatus 100. More precisely, the coordinate-converted image Vcc is not a birds'-eye image, but is a plan view of the road surface captured from a plane parallel to the road surface. Furthermore, image Vcc always represents the road surface as a flat surface even when, for example, there are low rises or obstructions in the road. This error/difference (low rises or obstructions), however, does not degrade the detection precision of the local positioning apparatus according to the present invention. This is because the positioning detection operation of the present invention uses a relatively near distance of only approximately fifty meters forward as the farthest forward point used for detection and control, and bumps and obstructions on the road surface can therefore be ignored.

If a full birds'-eye image of the road surface, i.e., a plan view image of the road surface captured perpendicularly to a horizontal plane perpendicular to the vertical line with respect to the gravitational axis is required, it can be obtained by various methods. One such method is to not fix the optical axis Ax of the digital imaging apparatus 100 to the automobile AM, and use a gyroscope or other automatic attitude control device to always obtain the image Vi from a constant attitude to the horizontal.

For reference, reverse coordinate conversion from a birds'-eye view coordinate system to a perspective view coordinate system can be achieved using equations 8 and 9 below.

$$x=FX/(Z \cos \theta + H \sin \theta) \quad (8)$$

$$z=F(H \cos \theta + Z \sin \theta)/(Z \cos \theta - H \sin \theta) \quad (9)$$

Figure 19:
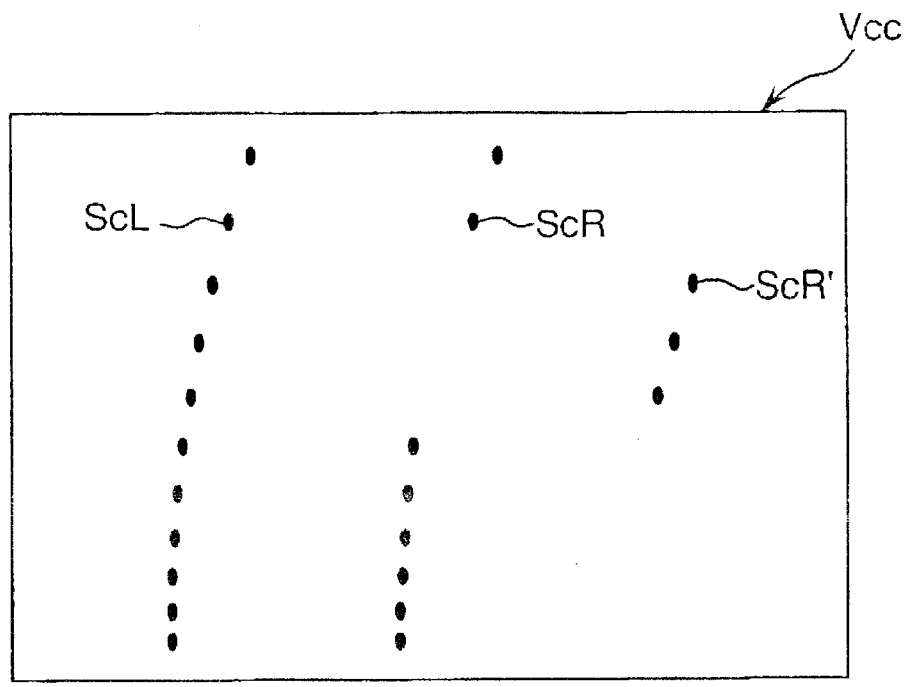
FIG. 19 shows a birds'-eye image after coordinate conversion of the road contour signal by the coordinate convertor in FIG. 2.

The contour image Vcc represented by the coordinate-converted birds'-eye contour signal Scc is shown in FIG. 19. The lane markers Lm1, Lm2, and Lm3 are represented by corresponding edge contours ScL, ScR, and ScR'. As will be known by comparison with the extracted contour image Vre in FIG. 8, the edge contours ScL, ScR, and ScR' are parallel throughout FIG. 19, and represent the actual lanes on the road. In other words, the coordinate-converted birds'-eye contour signal Scc contains correct dimension information for the subject.

Based on the coordinate-converted birds'-eye contour signal Scc, the matching detector 604 connected to the coordinate convertor 602 obtains line segments or arcs matching the edge contours ScL, ScR, and ScR' by applying the following equations.

The first step is a Hough conversion of the pixel data for the edge contours ScL, ScR, and ScR' of the lane markers in the birds'-eye contour signal Scc. This is accomplished by applying equation (10) below separately to the corresponding contour lines.

$$\rho = X \cos \phi + Z \sin \phi \quad (10)$$

where ρ is the distance between the origin O and the pixel in the Z-X coordinate system, and φ is the angle between the X-axis and a line joining the origin O and a particular pixel. The following equation (11) is then obtained after calculating equation (10).

$$X=(\rho - Z \sin \phi)/\cos \phi \quad (11)$$

A group of curves is obtained for each contour line by scanning the birds'-eye contour signal Scc and converting the contour line data to parametric space based on the above Hough conversion. The method of determining whether a contour line is a straight line segment or arc based on this group of curves is described below with reference to FIGS. 10 to 22.

Figure 20:
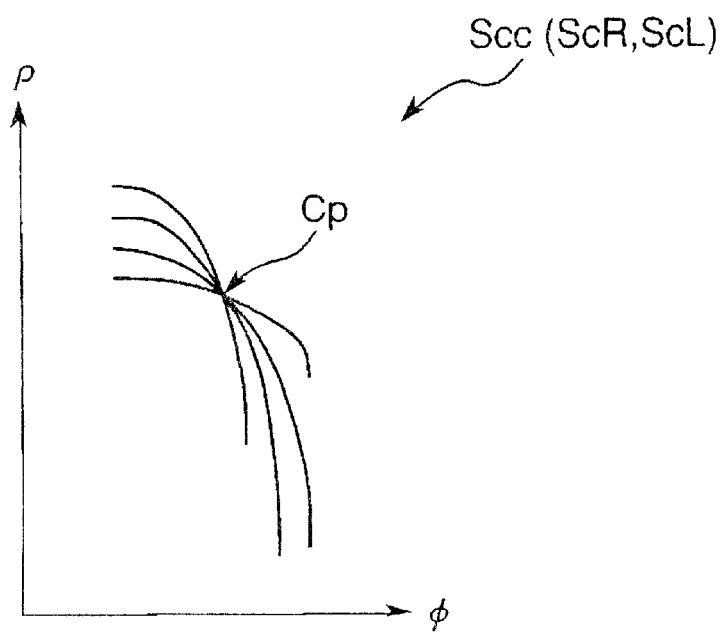
FIG. 20 is used to describe the curve patterns obtained by Hough conversion of the birds'-eye contour signal Scc in FIG. 19.

Typical patterns obtained when the Hough-converted line data is a straight line is shown in FIG. 20. Note that ideally each of the curves intersect at a single point Cp. As a practical matter, however, the lane markers Lm and contour lines are not usually completely straight lines, and convergence at a single point as shown in FIG. 20 thus rarely occurs. This problem can be resolved by noting that the curves tend to intersect at the same point, and investigating the frequency Fc that each curve intersects at each point (pixel) in the parametric space. it this frequency Fc is greater than a particular threshold value Eth, that point is defined as the unique point of intersection Cp. The corresponding contour line is then defined as a straight line, and the appropriate equation for a line is obtained.

Figure 21:
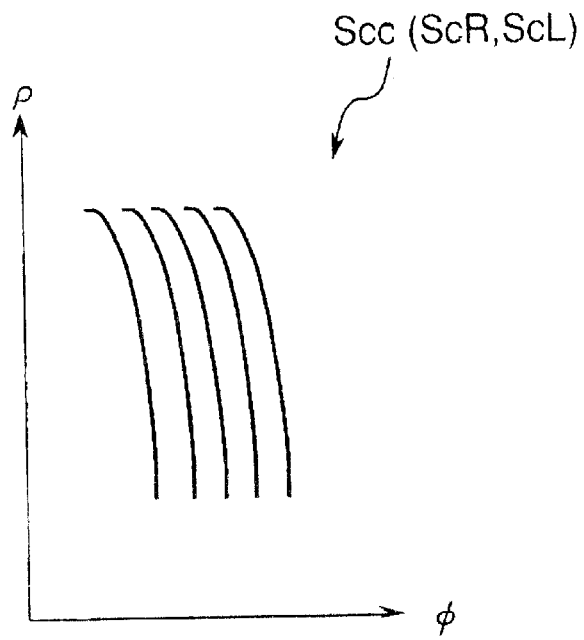
FIG. 21 is an alternative example of the curve patterns obtained by Hough conversion of the birds'-eye contour signal Scc in FIG. 19.
Figure 22:
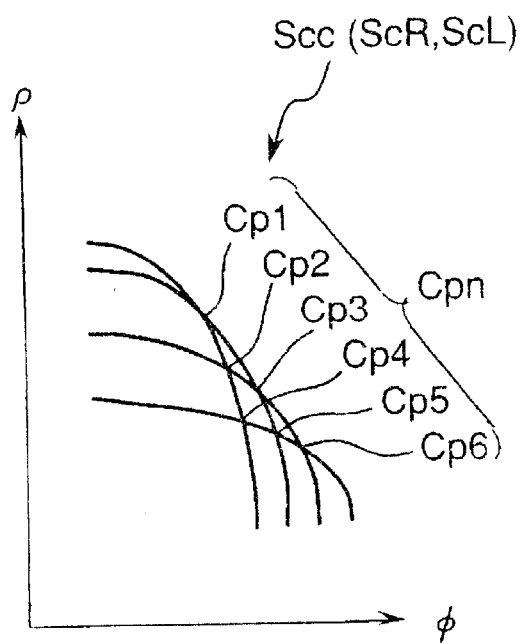
FIG. 22 is an alternative example of the curve patterns obtained by Hough conversion of the birds'-eye contour signal Scc in FIG. 19.

Typical patterns obtained when the Hough-converted line data is a curve is shown in FIGS. 21 and 22. As shown in these figures, there is neither no point of intersection (FIG. 21), or a group of curves intersect at a plurality of points Cpn (Cp1 to Cp6) as shown in FIG. 22. Note that n in this case is an integer value. The frequency of intersection Fc is again obtained. If there is no point where a new frequency threshold Fth' is exceeded, the group of curves is determined to not intersect, and the corresponding contour line is determined to be a curve (arc). The appropriate equation for a curve is then obtained.

It should be noted that these equations make it possible to determine particular dimensional features of the road; i.e., the lane that the automobile AM is either following or stopped in.

As shown in FIG. 2, the lane contour extractor 606 is connected to the matching detector 604, and receives therefrom the matching signal Sm. Note that the matching signal Sm also contains contour line data ScR', which is obtained from noise components as described above.

The lane contour extractor 606 compares the dimensional features data contained in the matching signal Sm with particular predetermined data such as the vehicle width, lane width, and the pattern of the center line lane marker Lm2 to remove contour data ScR' that is not appropriate to the target lane. The remaining contour line data ScR and ScL corresponding to the current lane is output as the matching signal Sm. If there is no data corresponding to the lane in the matching signal Sm, an error signal See (not shown in the figures) is output.

The filtering operation of the lane contour extractor 606 is described next with reference to FIG. 19.

This birds'-eye image Vcc contains three contour lines ScL, ScR, and ScR'. Counting down from the top of the image, the left two contour lines ScL and ScR are a contour line pair describing a single lane Lm down to the second pixels. The center line lane marker Lm2 in this image, however, is a divided line, and the contour line ScR' at the far side of the adjacent lane is therefore extracted from the birds'-eye contour signal Scc at pixels 3 to 5. The distance between ScL and ScR' in this case is obviously greater than the width of a single lane, but it is still not known at this point whether contour line ScL or ScR' represents noise.

From pixel 6 to 11, however, contour lines ScL and ScR are obviously paired. The left contour line ScL is also determined by the matching detector 604 to match a single arc ScLm, and pixels 3 to 5 furthermore corresponding to lane marker Lm1. The three pixels from pixel 3 to 5 in contour line ScR' are therefore ignored as noise. The two contour lines ScL and ScR are therefore extracted as a correct contour line pair. The matching contour lines ScLm and ScRm are thus selected, and output with the information of selected contour lines as the lane contour signal Slc.

Combined with the road area evaluation result output as road contour signal Sre by the lane detector 500, the lane contour extractor 606 thus effectively eliminates noise components, such as other markings and soiling on the road, that are unrelated to lane definition from the lane contour signal Slc.

Figure 23:
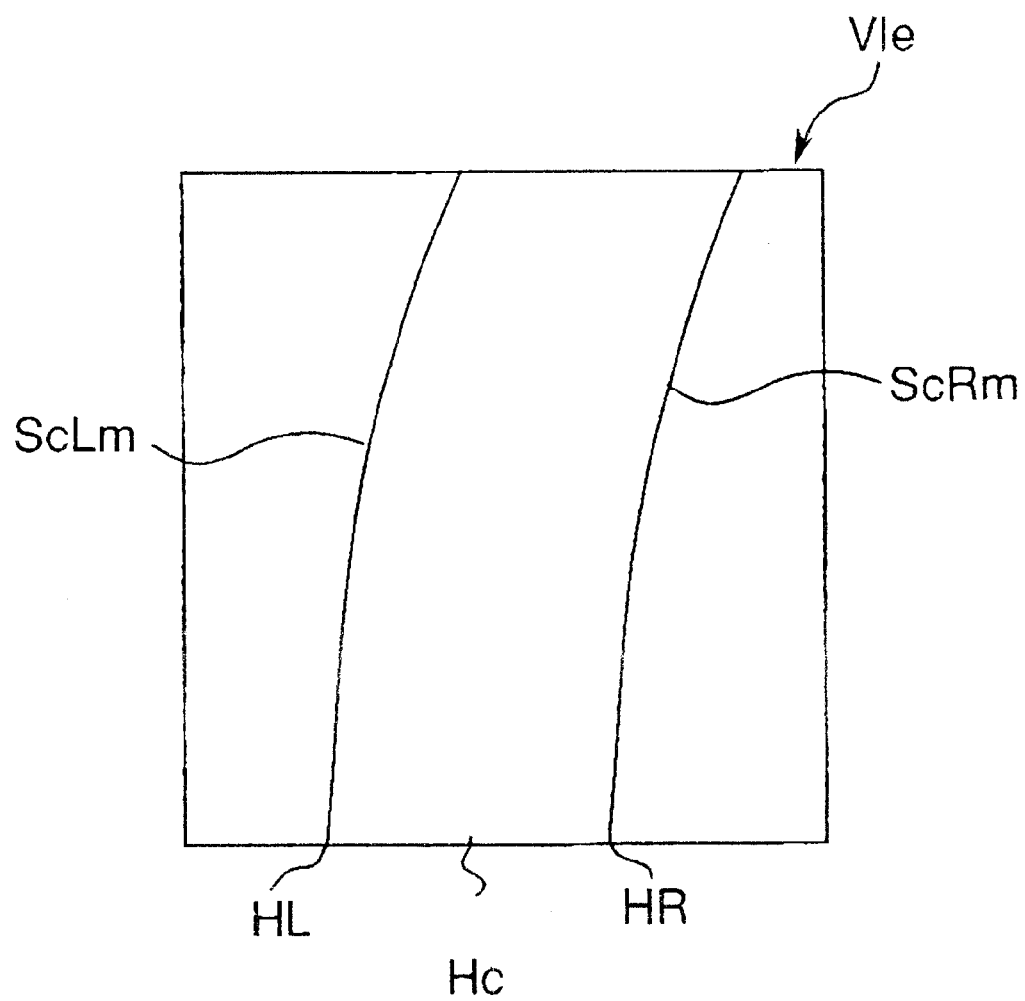
FIG. 23 is used to describe in-lane position detection by the in-lane position detector.

The extracted lane contour image Vle represented by the road contour signal Sle after noise removal by the lane contour extractor 606 is shown in FIG. 23.

The operation of the in-lane position detector 608 is described next with reference to FIG. 23.

Using the lane contour signal Slc, the in-lane position detector 608 obtains the relationship between a circle or line tangential to or intersecting the right and left contour lines ScLm and ScRm to obtain the points of intersection HL and HR at Z=0. The coordinates for the midpoint of this line segment, i.e., the coordinates (HC,0) of the line segment HL-HR, are then obtained. Note that the camera is located at (0,0). Therefore, if the digital imaging apparatus 100 is mounted at the widthwise center of the automobile AM, the position of the automobile AM relative to the lane can be expressed as the lateral displacement –HC from the lane center.

Figure 24:
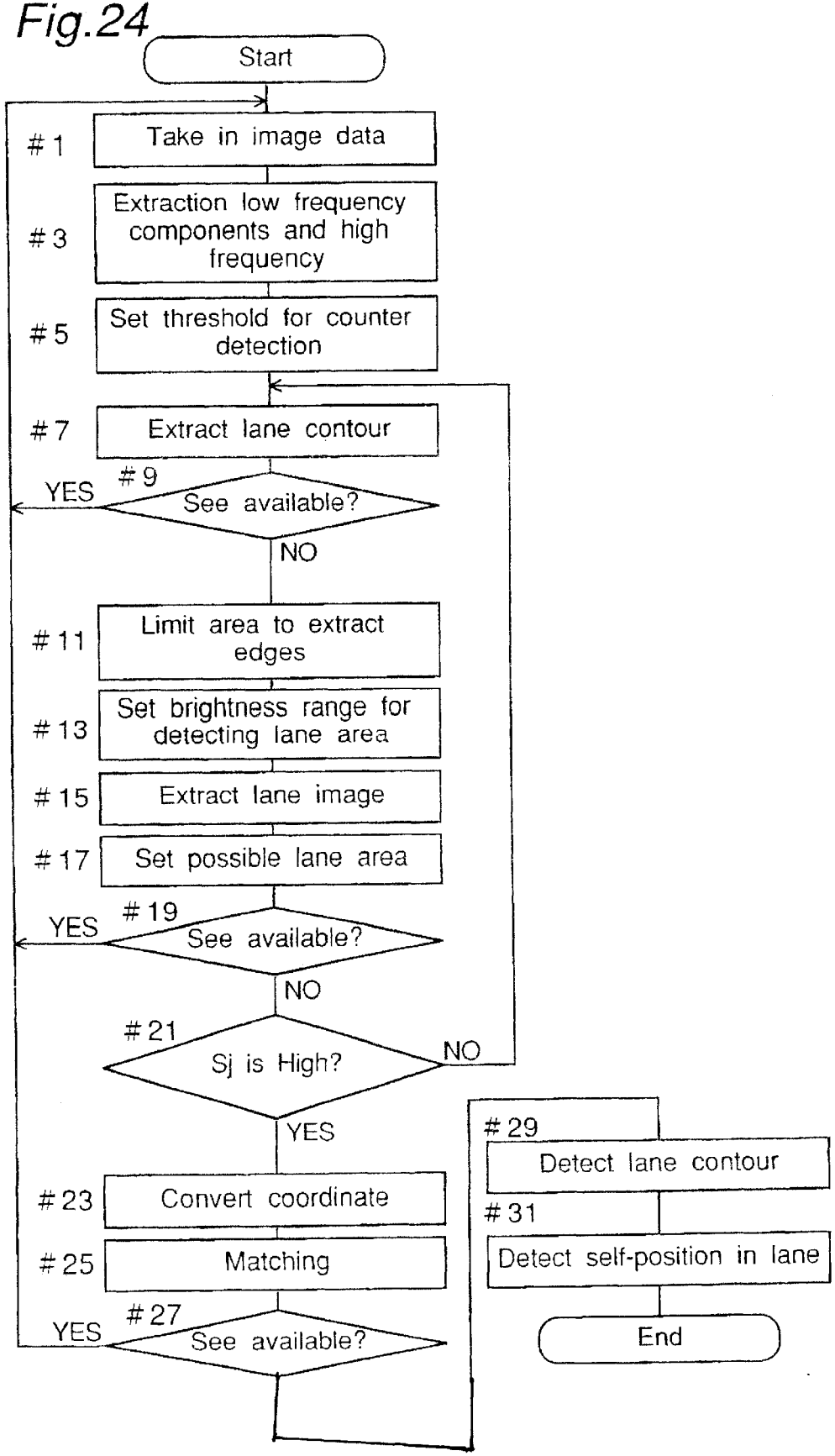
FIG. 24 is a flow chart used to describe the overall operation of the local positioning apparatus shown in FIG. 1.
Figure 25:
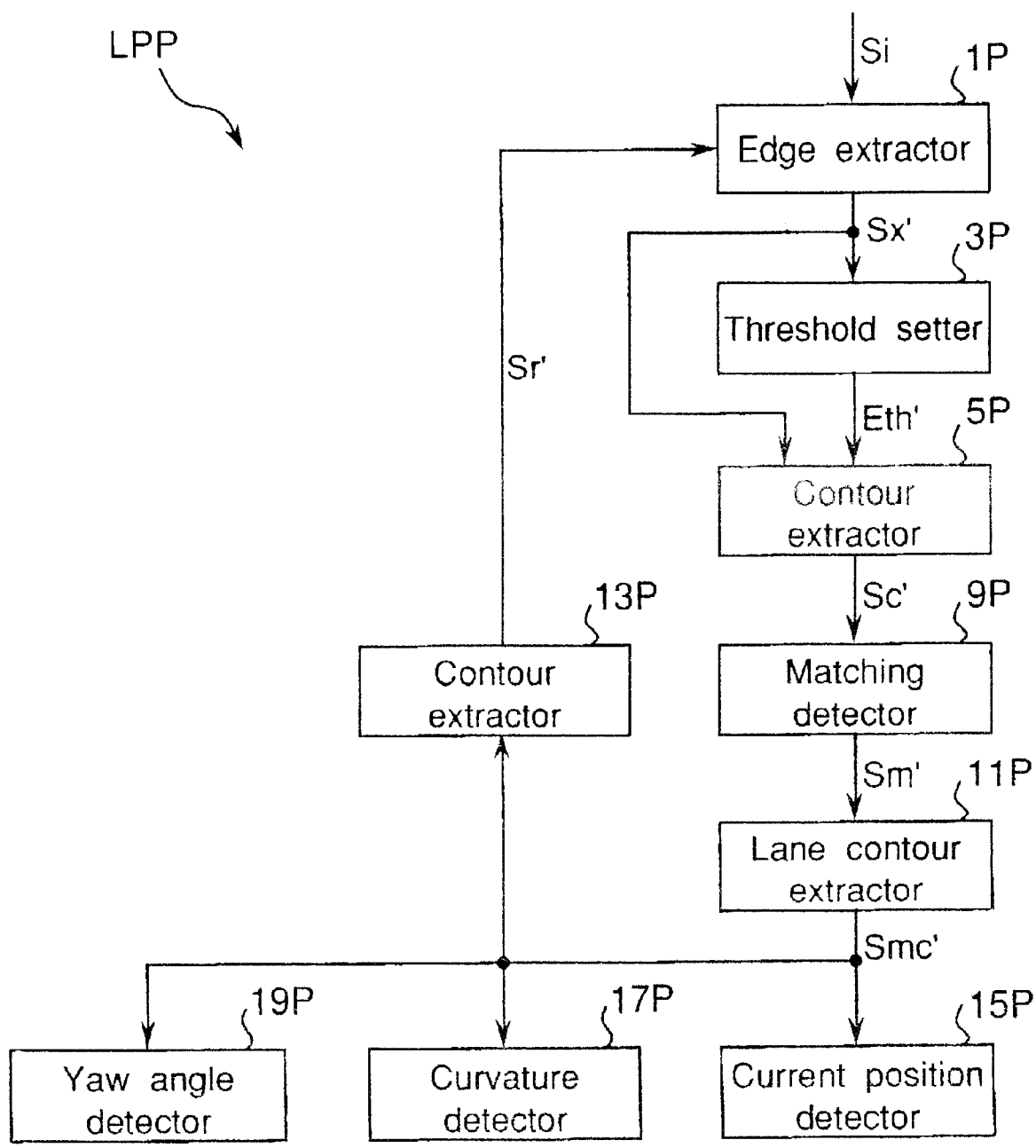
FIG. 25 is a block diagram of a local positioning apparatus according to the prior art.

The overall operation of a local positioning apparatus LP according to an exemplary embodiment of the present invention is described next below with reference to the flow chart in FIG. 24.

Operation starts after a digital image signal Si is generated by means of the digital imaging apparatus 100 capturing a picture of the view to the front of the automobile AM (block #1).

The spatial frequency separator 200 then extracts the low spatial frequency signal SL and high spatial frequency signal SH from the digital image signal Si (block #3).

The threshold setter 402 then sets a threshold value Eth based on the edge pixel density in the high spatial frequency signal SH, and generates the contour threshold signal Sth (block #5).

Based on the contour threshold signal Sth, the contour extractor 404 extracts the lane marker contours using the threshold value Eth derived from the high spatial frequency signal SH, and outputs the road contour signal Sre (block #7).

Whether an error signal See is output in place of the road contour signal Sre is then determined (block #9). If the error signal See is output, contour lines have not been extracted. A YES is therefore returned and the procedure loops back to block #1. If NO is returned, the procedure advances.

Based on the road contour signal Sre, the contour extraction region limiter 406 then defines the area in the high spatial frequency signal SH to be used for contour extraction, and outputs a region limiting signal Sr to the high frequency extractor 204 (block #11). This feedback loop (see FIG. 2) causes the high frequency extractor 204 to extract the high frequency component in the area defined by the region limiting signal Sr within the digital image signal Si at block #3 above, and generate the high spatial frequency signal SH from this limited region.

The road brightness setter 302 then sets a road surface luminance area (Bmax, Bmin) in the low spatial frequency signal SL resulting from block #3, and outputs a road brightness signal SBr (block #13).

Based on the road brightness signal SBr, the road image extractor 304 then extracts the road surface image from the low spatial frequency signal SL to generate the road extraction signal Srs (block #15).

Next, based on the road brightness signal SBr and road extraction signal Srs, the road region setter 306 generates a road region signal Srr describing the road edge areas AeR and AeL (block #17).

Whether the error signal See is output in place of the road region signal Srr is then detected (block #19). If the road region has not been detected, YES is returned and the procedure loops back to block #1. If NO is returned, the procedure advances.

The lane detector 500 then determines whether the extracted contour lines described by the road contour signal Sre are valid based on the road region signal Srr (block #21). If the result is NO, the contour extractor 404 is driven again by means of the road judgement signal Sj to update the road contour signal Sre. The sequence from block #7 to block #21 is thus repeated until valid contour lines are extracted. The road contour signal Sre is passed to the local position detector 600 only once the contour lines are determined to be valid (correct).

The coordinate convertor 602 then coordinate converts the extracted contour image Vre of the road contour signal Sre to a birds'-eye image Vcc to generate a birds'-eye contour signal Scc (block #23).

The matching detector 604 then uses a Hough conversion or other appropriate conversion method to match an equation describing the internal contour lines of the birds'-eye contour signal Scc to straight line segments or arcs (block #25). The matching detector 604 also outputs a matching signal Sm representing the matching line segments or arcs.

Whether an error signal See is output in place of the matching signal Sm is then determined (block #27). If there are no matching line or arc segments, YES is returned and the procedure loops back to block #1. If NO is returned, the procedure advances.

Dimensional features of the matching contour lines indicated by the matching signal Sm are then compared with the dimensional features of the automobile AM by the lane contour extractor 606 (block #29). The lane contour extractor 606 thus extracts a pair of lane contour lines describing the lane currently occupied by the vehicle, and generates a lane contour signal Slc.

The current position of the automobile AM is then detected by the in-lane position detector 608 bas ed on the lane contour signal Slc, and a position detection signal Sp is thus output (block #31).

Note that, if the error signal See is detected in blocks #9, #19, or #27 above, the procedure is returned to the beginning (block #1) to achieve more precise lane detection and position detection by executing the procedure for each intervening block based on the high spatial frequency signal SH and low spatial frequency signal SL extracted at the same time. Depending on the desired precision, however, blocks #9, #19, or #27 can be omitted without substantially affecting the results achieved by the present invention.

Second Embodiment

Figure 26:
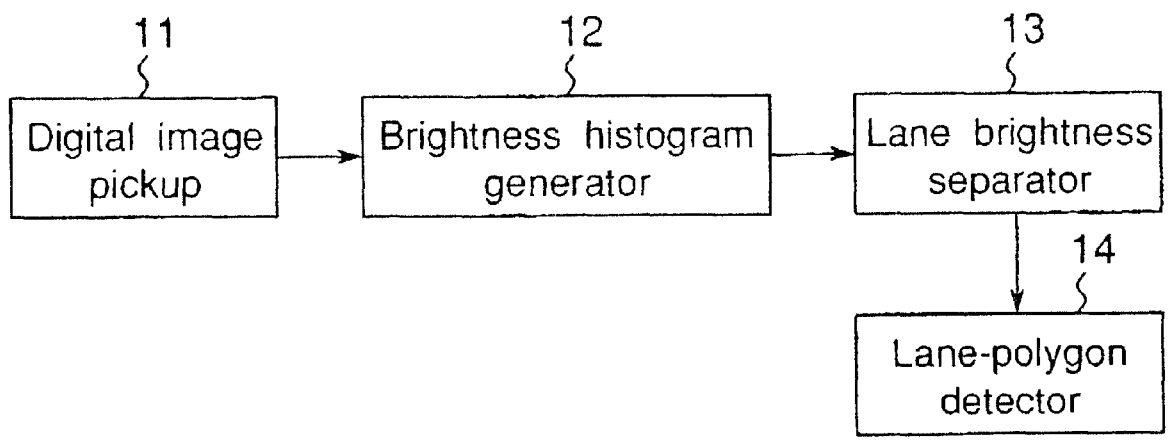
FIG. 26 is a block diagram of a road area extraction apparatus according to a second embodiment of the present invention.

A local positioning apparatus according to a second exemplary embodiment of the present invention is described next below with reference to FIGS. 26 to 45. FIG. 26 is a block diagram of a road area extraction apparatus according to the present embodiment of the invention, which comprises a digital image pickup 11, brightness histogram generator 12, lane brightness separator 13, and lane polygon detector 14.

The digital image pickup 11 is typically a video camera used for capturing an image of the road in front of the vehicle. If the digital image pickup 11 is mounted at approximately the center front of the vehicle, the bottom center portion of the captured image will necessarily contain the road surface, as is described further below.

Figure 27:
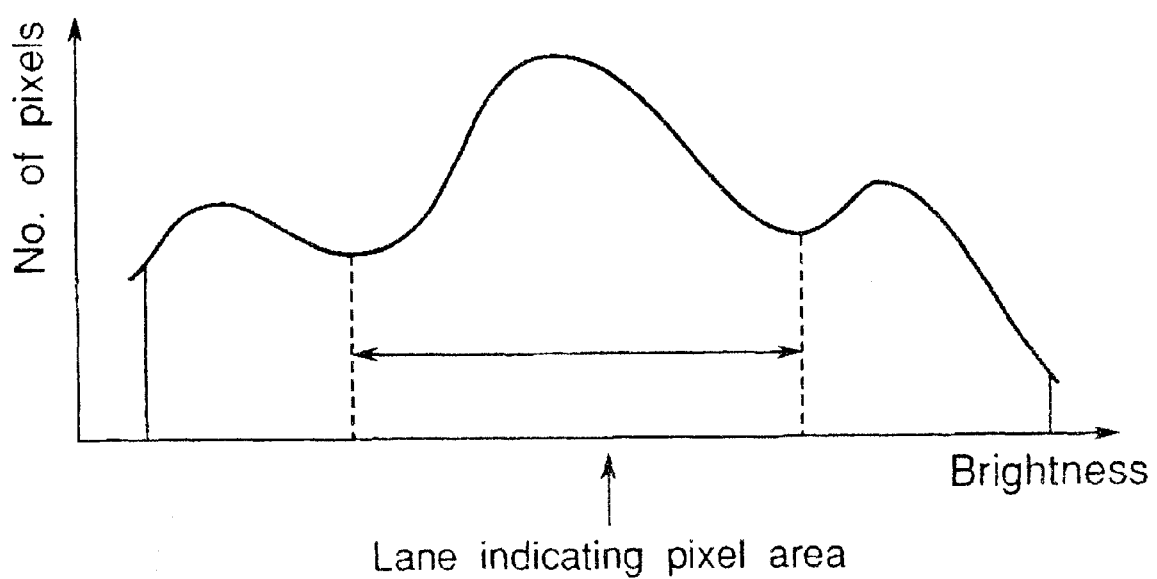
FIG. 27 is an example of a brightness histogram generated from the road image by the brightness histogram generator in FIG. 26.

The brightness histogram generator 12 produces a brightness histogram, as shown in FIG. 27, from the input road image data. Using this brightness histogram, the brightness histogram generator 12 also detects the vehicle position in the image, i.e., detects the luminance at the bottom middle part of the image.

Using the histogram, the lane brightness separator 13 detects the change in brightness to the right and left sides of the luminance at the vehicle position in the image. By detecting valleys in the brightness level, the lane brightness separator 13 finds the luminance range corresponding to the lane area, and extracts the pixels in that range as lane area candidate pixels.

Referencing the extracted lane area candidate pixels, the lane polygon detector 14 finds the edges of the corresponding pixel area to the right and left sides of the bottom scanning line of the image. It then detects the midpoint between these side edges, and then repeats the edge pixel detection process at another scanning line higher in the image. The result of this process is a polygon that is detected as the road area.

Figure 28:
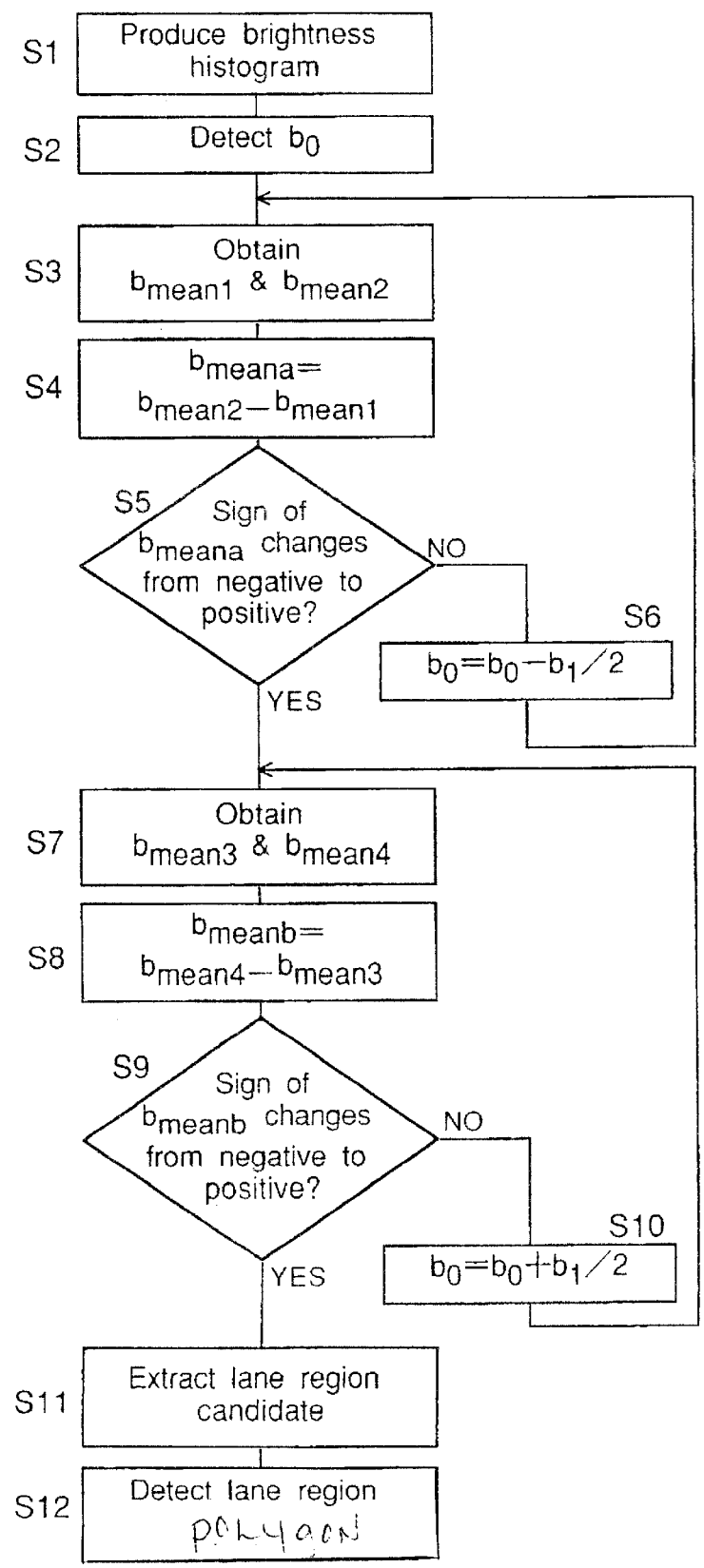
FIG. 28 is a flow chart used to describe the overall operation of the road area extraction apparatus shown in FIG. 26.

This process is described more specifically below with reference to the flow chart in FIG. 28.

The first step is to generate a brightness histogram from the luminance data captured by the digital imaging pickup 11 (step S1).

Using the brightness b0 at the bottom center of the image, the position in the histogram corresponding to the road surface directly below the vehicle is obtained (step S2). A valley on the left side is detected first.

Mean brightness values $b_{mean}1$ and $b_{mean}2$ are then obtained for the overlapping brightness regions $b_0-b_1 \leq b < b_0$ and $b_0-b_1/2 \leq b < b_0-b_1/2$ where b is a brightness parameter and $b_1$ is a constant brightness level (step S3).

The equation $b_{mean}a=b_{mean}2-b_{mean}1$ is then calculated (step S4), and the sign of $b_{mean}a$ is then determined (step S5). A valley is detected by determining when the sign changes from negative to positive.

If the sign has not changed from negative to positive, $b_0=b_0-b_1/2$ (step S6), and the procedure loops back to step S3 (step S6). This process is repeated until a valley is detected to the left side.

A similar process is then executed to detect a valley on the right. The first step (step S7) is to reinitialize $b_0$ to the value detected in s2, and then calculate $b_{mean}3$ and $b_{mean}4$ for the regions $b_0 < b \leq b_0+b_1$ and $b_0+b_1/2 < b \leq b_0+3b_1/2$. The equation $b_{mean}b=b_{mean}4-b_{mean}3$ is then obtained (step S8).

A valley is detected by determining when the sign changes from negative to positive. If the sign has not changed from negative to positive, $b_0=b_0+b_1/2$ (step S10), and the procedure loops back to step S7 (step S9). This process is repeated until a valley is detected to the right side.

The pixels in the brightness region between the detected valleys are then detected as the lane area candidate region of the image (step S11).

Figure 29:
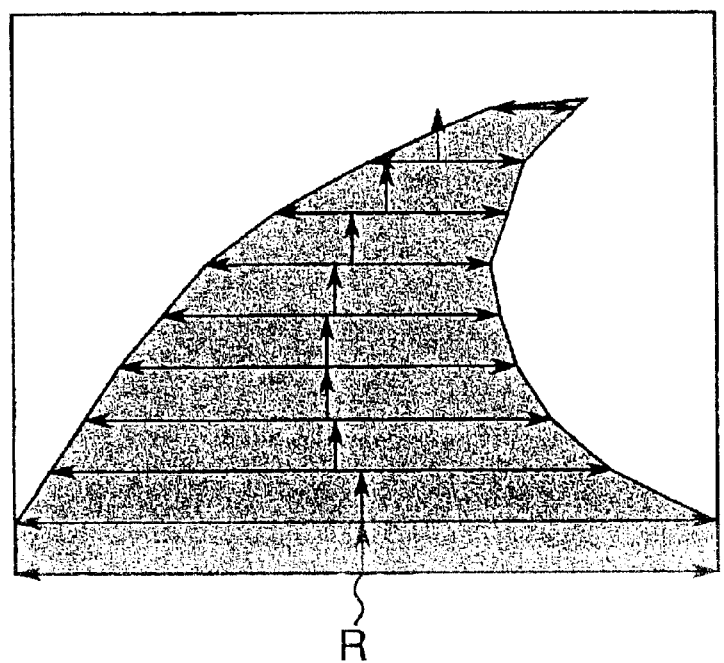
FIG. 29 is used to describe the method of detection lane edges from the extracted lane area by means of the road area extraction apparatus shown in FIG. 26.

Referencing the extracted lane area candidate pixels, the edges of the pixel areas to the right and left sides of the bottom scanning line of the image are detected as shown in FIG. 29. It then detects the midpoint between these side edges, and then repeats the edge pixel detection process at another scanning line higher in the image. The result of this process is a polygon as shown in FIG. 29 detected as the road area.

As described above, the road area extraction apparatus of the present embodiment detects an area containing the luminance value directly below the vehicle in the brightness histogram. Using the image area corresponding to this brightness value, the edges of the road area are then detected using a center-outward pixel comparison method. The road edges thus extracted are an accurate representation of the road area in that image.

Figure 30:
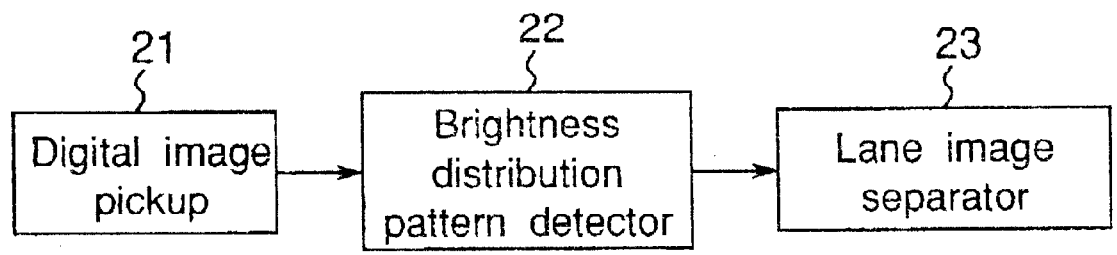
FIG. 30 is a block diagram of a road area extraction apparatus according to a first alternative of second embodiment of the present invention.

A first alternative of second embodiment of a road area extraction apparatus according to the present invention is described next below with reference to FIGS. 30 and 31. This road area extraction apparatus comprises a digital image pickup 21, brightness distribution pattern detector 22, and lane image separator 23.

The digital image pickup 21 is typically a video camera used for capturing an image of the road in front of the vehicle. If the digital image pickup 21 is mounted at approximately the center front of the vehicle, the bottom center R portion of the captured image will necessarily contain the road surface, as is described further below.

Figure 31:
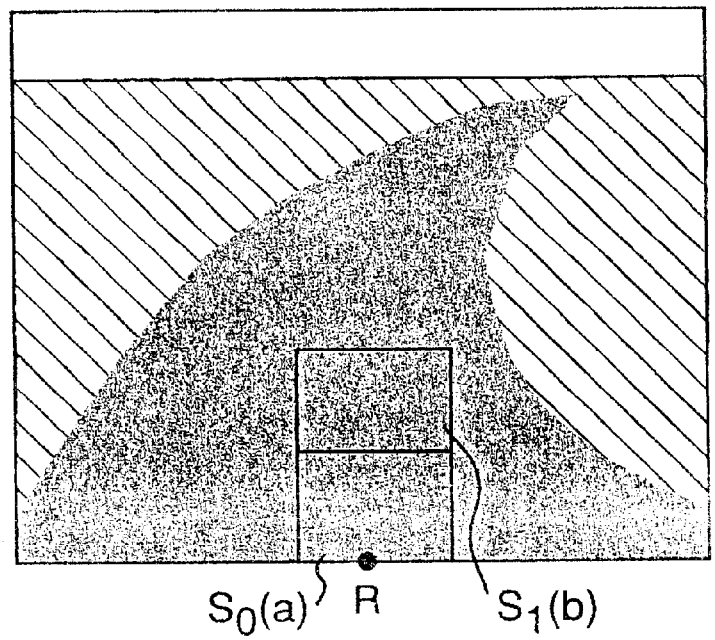
FIG. 31 is used to describe the area occupied by the lane area in the brightness histogram generated by the road area extraction apparatus in FIG. 30.

The brightness distribution pattern detector 22 samples a defined region $S_0$ from the bottom middle of the road image data as shown in FIG. 31, and determines the brightness distribution a in this area.

Figure 32:
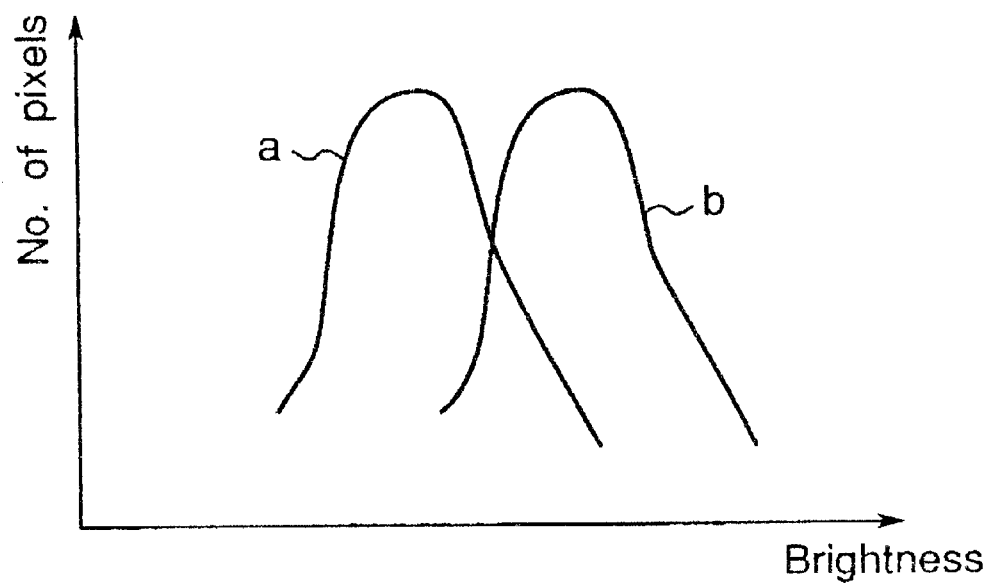
FIG. 32 is used to describe the brightness distribution obtained by segmenting the road image by means of the lane image separator, and the brightness distribution pattern obtained by the brightness distribution pattern detector in FIG. 30.

The lane image separator 23 then divides the lane image and compares the brightness distribution b of each image segment with the brightness distribution pattern a obtained by the brightness distribution pattern detector 22 as shown in FIG. 32. If the patterns match, the image area is determined to be a road area.

Figure 33:
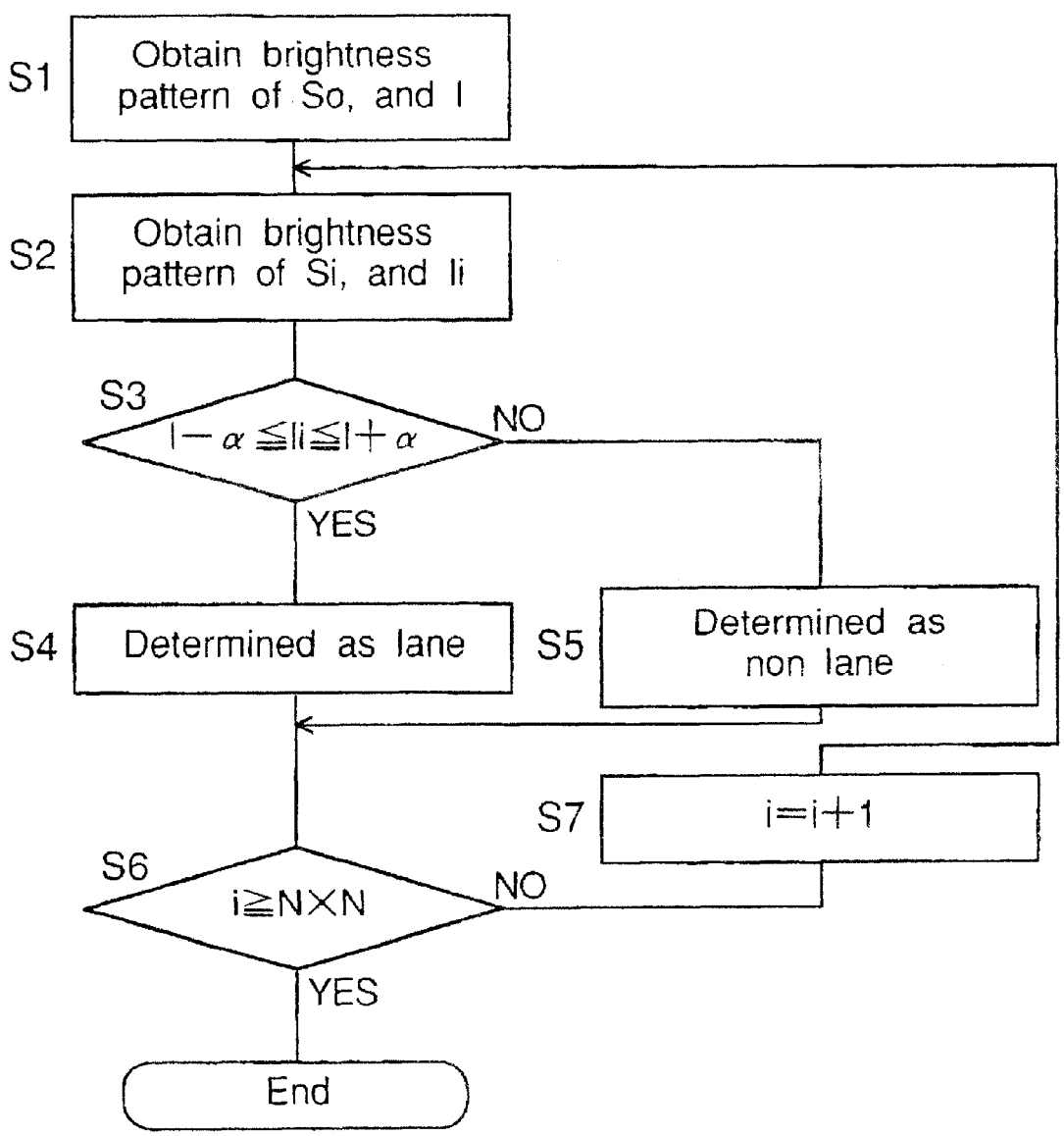
FIG. 33 is a flow chart used to describe the overall operation of the road area extraction apparatus shown in FIG. 30.

The operation of this road area extraction apparatus is described below with reference to the flow chart in FIG. 33.

The brightness distribution pattern of the defined region $S_0$ at the bottom middle of the road image data is obtained by calculating brightness mean m and distribution s in region $S_0$. The maximum logarithmic probability 1 is then calculated as follows where n is the number of data points in the region $S_0$.

$$1(\mu, \sigma^2) = -(n/2) \log 2\pi\sigma^2 - n/2 \qquad (12)$$

The road image is then separated into N×N (the number of data points in this region), the brightness distribution pattern of an area Si different from region S0 is obtained by calculating brightness mean $\mu i$ and distribution $\sigma i$ in region Si. The maximum logarithmic probability li is then calculated as follows where n is the number of data points in the region Si.

If the maximum logarithmic probability li is $1-\alpha \leq li \leq 1+\alpha$ (where $\alpha$ is a positive integer) in step S3, the area is determined to be a lane in step S4. For example, region S1 is determined to be a lane because the distribution patterns are similar although the brightness levels of patterns a and b in FIG. 32 differ.

If the above equation is not true, the area is determined not to be a lane at step S5.

If i≧N×N at step S6, the process ends. If not, i is incremented to i+1 at step S7, and the procedure loops back to step S2.

As described above, the road area extraction apparatus of the present embodiment detects an area with the same brightness pattern as the area directly below the vehicle in the brightness histogram to accurately extract the lane area. The overall image can also be segmented based on a probability comparison with the S0 of the brightness pattern.

Figure 34:
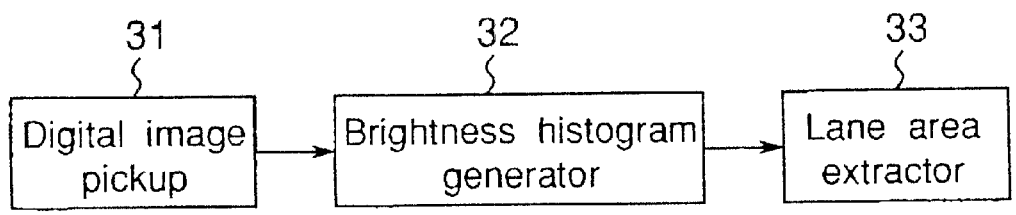
FIG. 34 is a block diagram of a road area extraction apparatus according to a second alternative of the second embodiment of the present invention.
Figure 35:
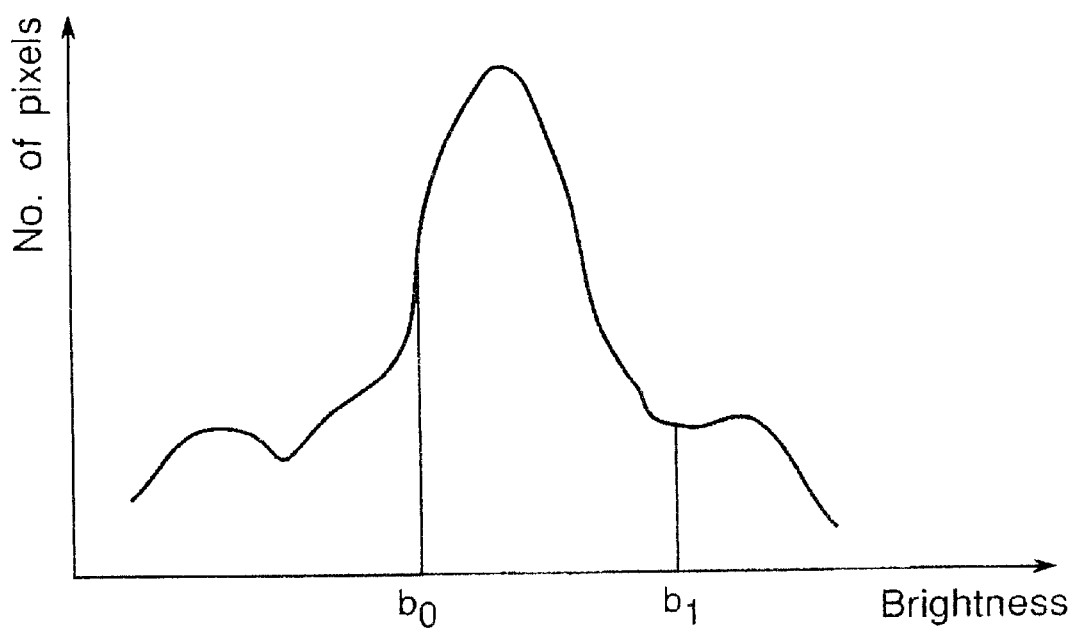
FIG. 35 is an example of a brightness histogram generated from the road image by the brightness histogram generator in FIG. 34.

A second alternative of a road area extraction apparatus according to the second embodiment of the present invention is described next below with reference to FIGS. 34 and 35. This road area extraction apparatus comprises a digital image pickup 31, brightness histogram generator 32, and lane image extractor 33.

The digital image pickup 31 is typically a video camera used for capturing an image of the road in front of the vehicle as described in the preceding alternatives.

The brightness histogram generator 32 produces a brightness histogram from the input road image data. Using this brightness histogram, the brightness histogram generator 32 also detects the vehicle position in the image, i.e., detects the luminance at the bottom middle part of the image. In this histogram, the number of pixels having a brightness level greater than the brightness at the vehicle position and corresponding to the road area is substantially constant. This pixel count is defined as pixel count g below. Note that this pixel count g also varies according to such factors as the camera height and view angle.

The lane image extractor 33 determines the brightness range containing pixels corresponding to the road. The pixels of the road image in the brightness range determined to be the lane area of the brightness histogram are extracted to obtain the lane area.

Figure 36:
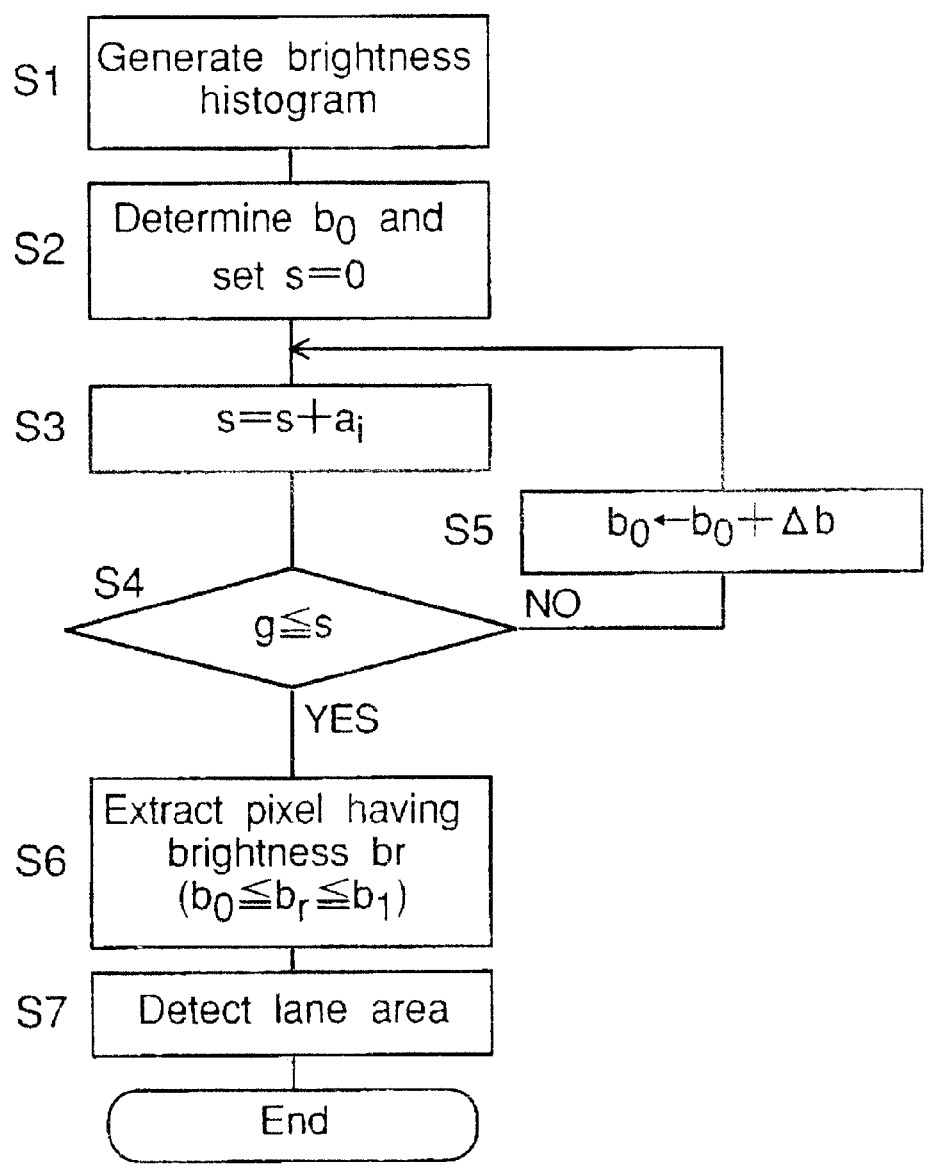
FIG. 36 is a flow chart used to describe the overall operation of the road area extraction apparatus shown in FIG. 34.

The operation of the above road area extraction apparatus is described below with reference to the flow chart in FIG. 36.

The first step is to generate a brightness histogram from the luminance data captured by the digital imaging pickup (step S1). The brightness histogram shown in FIG. 35 is exemplary of this histogram.

Using the brightness b0 at the bottom center of the image, the sum s of the frequency, or number of pixels observed is obtained (step S2).

Using the frequency a of pixels with a higher brightness level, the sum s of the frequency is obtained (step S3).

The lane area is determined to have been extracted if s is greater than the previously obtained pixel count g corresponding to the lane area. If s is less than g, the procedure loops back to step S5 and S3, and the frequency ai of brightness b0+Db is obtained. If s is greater than g, the procedure advances to step S6 and S7. The brightness b1 and original brightness b0 at the vehicle position are then used to extract the pixels of brightness br where b0≦br≦b1. the procedure advances to step S5 and S6. The brightness b1 and original brightness b0 at the vehicle position are then used to extract the pixels of brightness br where b0≦br≦b1.

These pixels are then located on the road image to obtain the lane area (step S7).

The brightness values of the road use the common tendency of a road to have a continuous brightness level that is lower than the brightness immediately before the vehicle. The brightness immediately below the vehicle is therefore obtained from a brightness histogram, the brightness values containing the frequency of the number of pixels in the lane area of the image, which is previously determined, is obtained from this brightness value before the vehicle, and the lane area can thus be accurately extracted.

Figure 37:
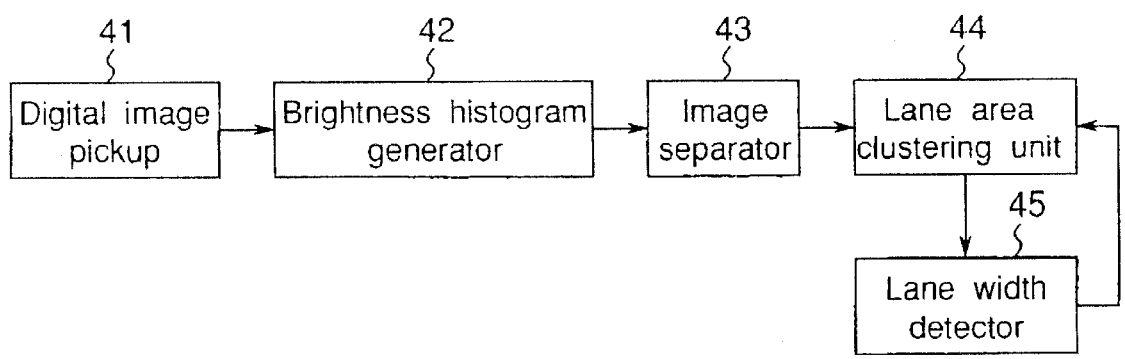
FIG. 37 is a block diagram of a road area extraction apparatus according to a third alternative of the second embodiment of the present invention.

A third alternative of a road area extraction apparatus according to the second embodiment of the present invention is described next below with reference to FIGS. 37 to 39. This road area extraction apparatus comprises a digital image pickup 41, brightness histogram generator 42, image separator 43, lane area clustering unit 44, and lane width detector 45.

The digital image pickup 41 is typically a video camera used for capturing an image of the road in front of the vehicle as described in the preceding alternatives.

Figure 38:
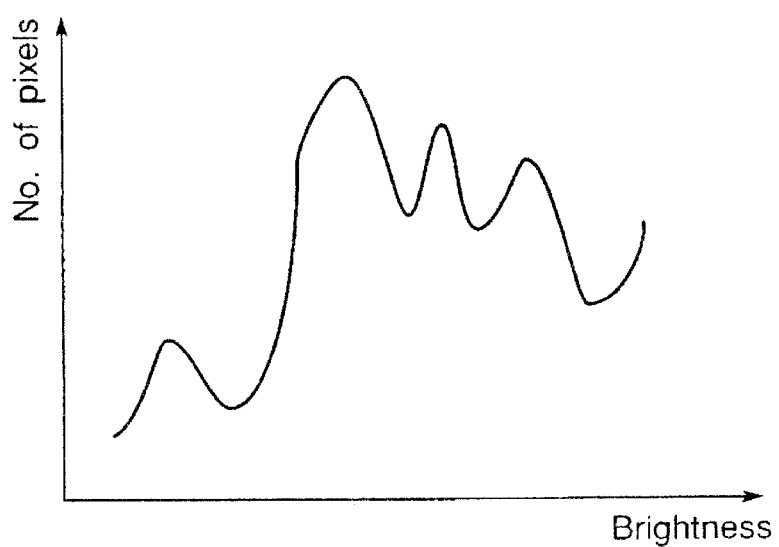
FIG. 38 is an example of a brightness histogram generated from the road image by the brightness histogram generator in FIG. 37.

The brightness histogram generator 42 produces a brightness histogram from the input road image data as shown in FIG. 38. Using this brightness histogram, the brightness histogram generator 42 also detects the vehicle position in the image, i.e., detects the luminance at the bottom middle part of the image.

Figure 39:
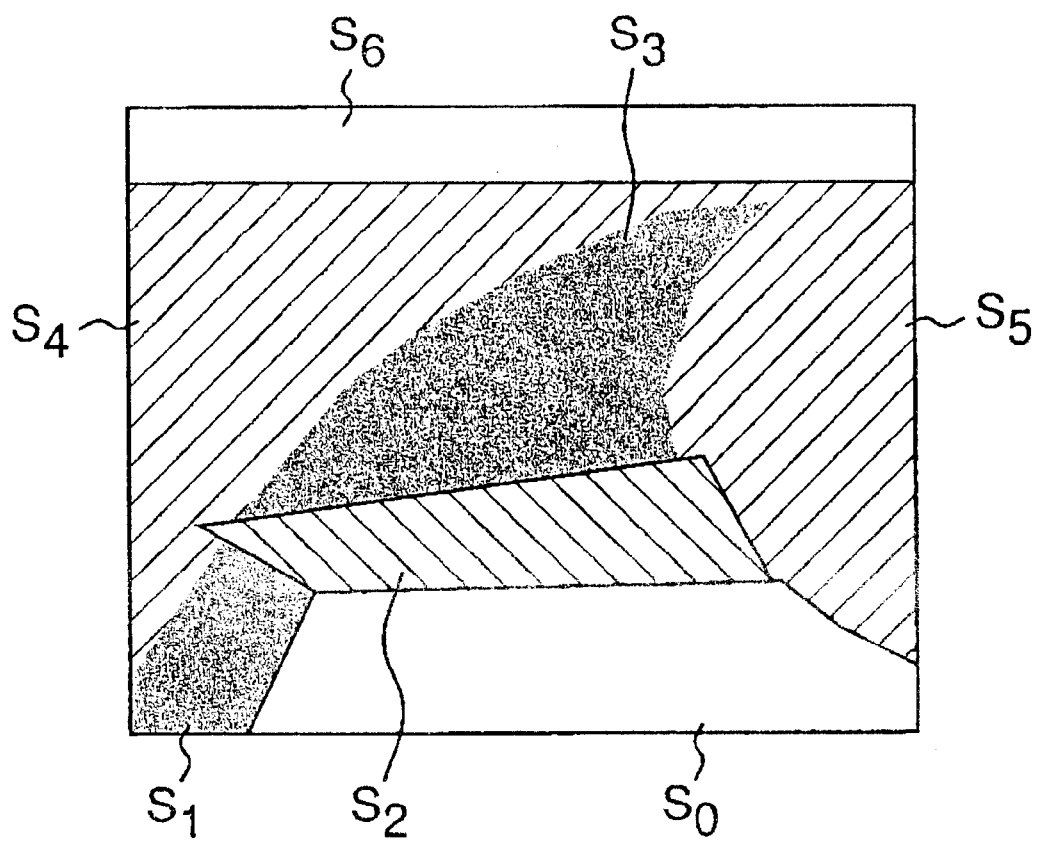
FIG. 39 is used to describe road image segmentation by the image separator 43 shown in FIG. 37.

The image separator 43 then detects all valleys in from the brightness distribution, producing a segmented lane image as shown in FIG. 39.

Based on the lane width information from the lane width detector 45, the lane area clustering unit 44 merges the segment below the vehicle with the first horizontal segment, and then with a segment in the vertical direction. The lane width detector 45 obtains the lane width from the image height based on the lane area obtained from the lane area clustering unit 44.

Figure 40:
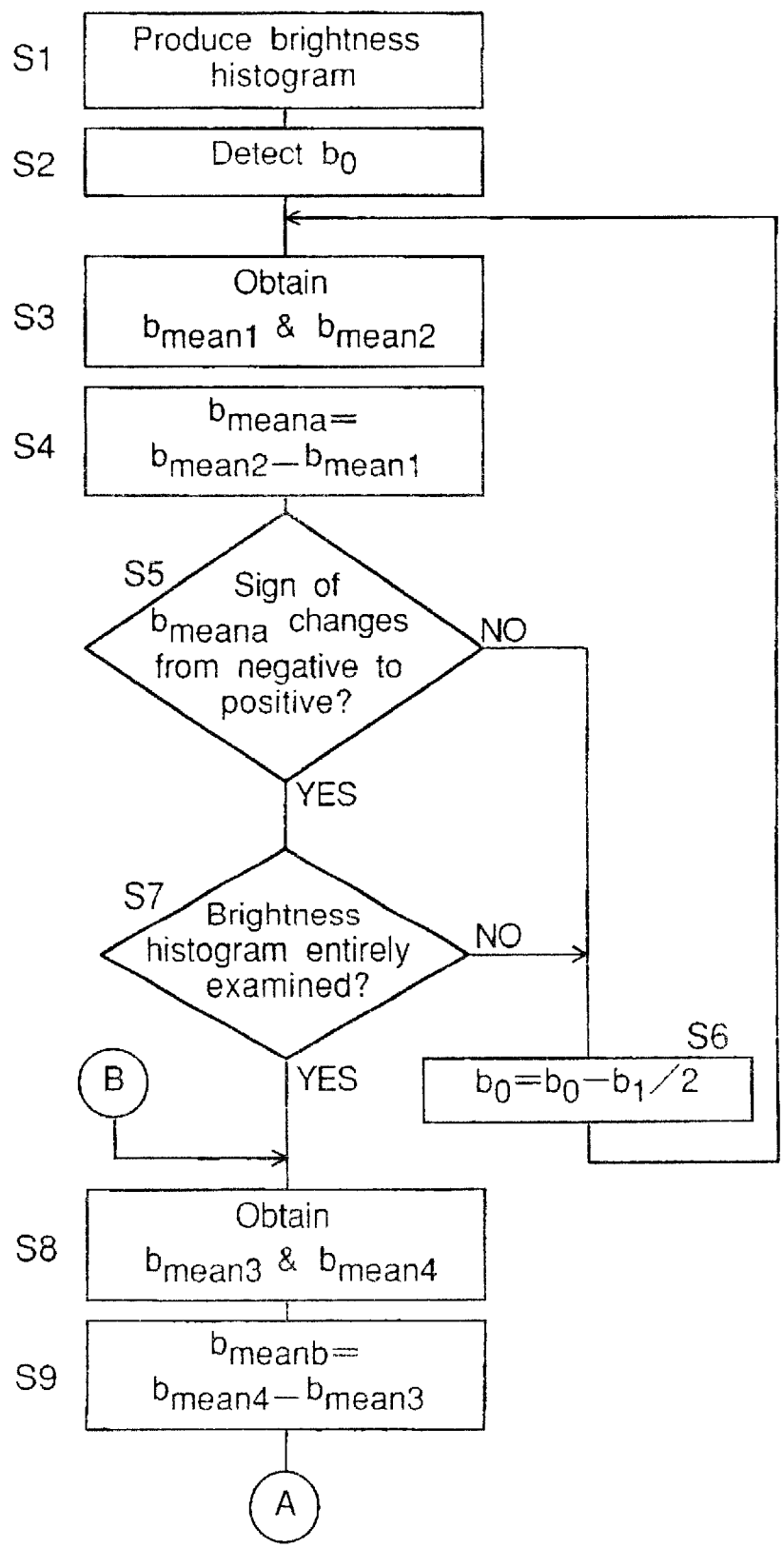
FIG. 40 is the first part of a flow chart used to describe the overall operation of the road area extraction apparatus shown in FIG. 37.

The road area extraction apparatus thus comprised operates as described below with reference to the flow chart in FIGS. 40 and 41.

The first step is to generate a brightness histogram as shown in FIG. 38 from the luminance data captured by the digital imaging pickup (step S1).

Using the brightness b0 at the bottom center of the image, the position in the histogram corresponding to the road surface directly below the vehicle is obtained (step S2). A valley on the left side is detected first.

Mean brightness values $b_{mean}1$ and $b_{mean}2$ are then obtained for the overlapping brightness regions b0−b1≦b<b0 and b0−3b1/2≦b≦b0−b1/2 where b is a brightness parameter and $b_1$ is a constant brightness level (step S3).

The equation $b_{mean}a = b_{mean}2 - b_{mean}1$ is then calculated (step S4), and the sign of $b_{mean}a$ is then determined (step S5). A valley is detected by determining when the sign changes from negative to positive.

If the sign has not changed from negative to positive, $b_0=b_0-b_1/2$ (step S6), and the procedure loops back to step S3 (step S6). This process is repeated to the left side of the histogram (step S7), and the procedure then advances to step S8.

A similar process is then executed to detect a valley on the right.

The first step (step S8) is to reinitialize $b_0$ to the value detected in S2, and then calculate $b_{mean}3$ and $b_{mean}4$ for the regions $b_0<b\leq b_0+b_1$ and $b_0+b_1/2<b\leq b_0+3b_{11652}/2$. The equation $b_{mean}b_{mean}4b_{mean}3$ is then obtained (step S9).

Figure 41:
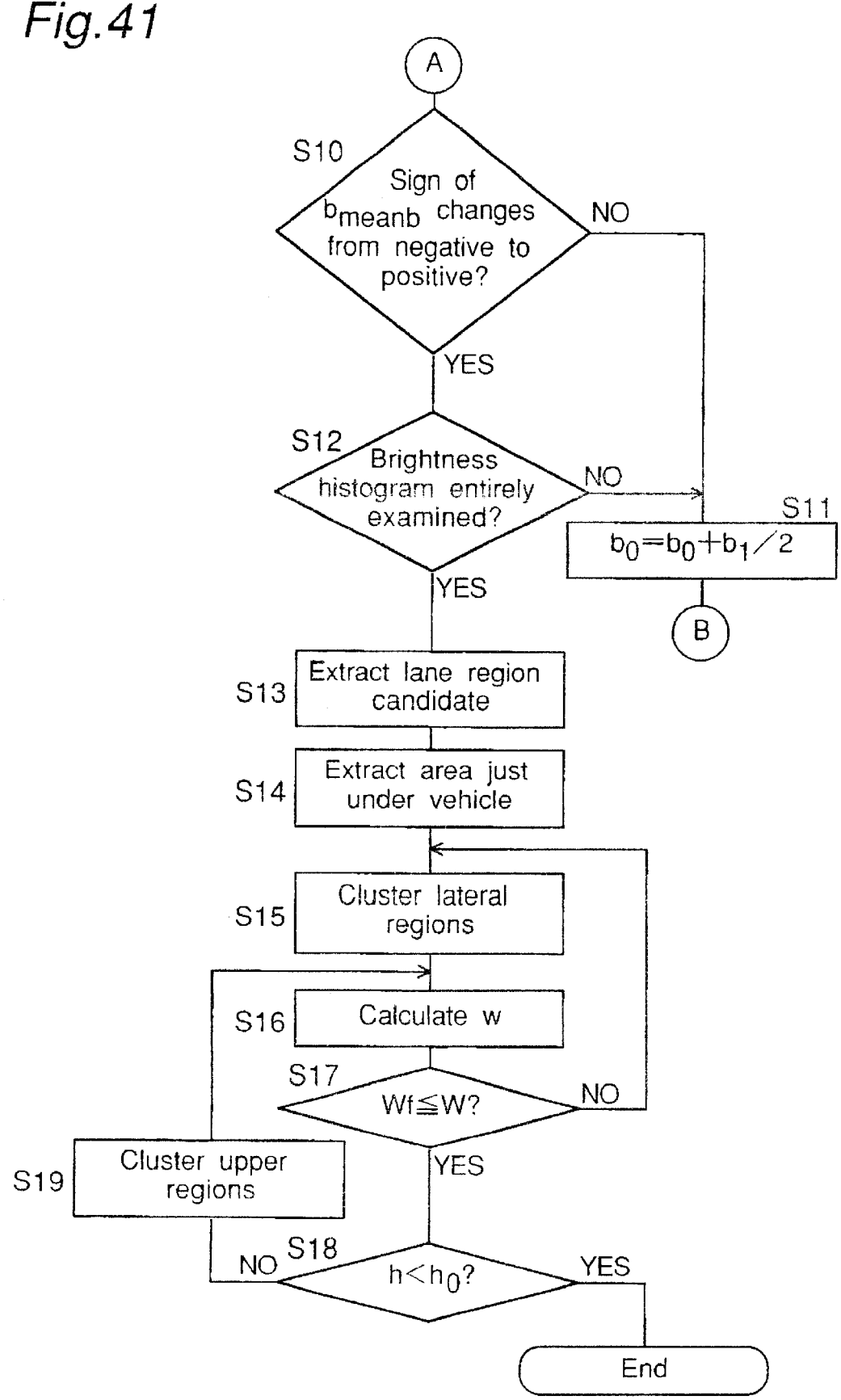
FIG. 41 is the second part of a flow chart used to describe the overall operation of the road area extraction apparatus shown in FIG. 37.

A valley is detected by determining when the sign changes from negative to positive (step S10 FIG. 41). If the sign has not changed from negative to positive, $b_0=b_0+b_1/2$ (step S11), and the procedure loops back to step S7 (step S11). This process is repeated until a valley is detected to the right side.

Whether valleys have been detected to the right side of the histogram is then determined (step S12). If not, steps S11 and S8 are repeated. If step S12 returns YES, the pixels in the brightness region between the detected valleys are then detected as the lane area candidate region of the image (step S13). FIG. 39 represents the input image separated into the areas between the detected valleys.

The area directly below the vehicle is then detected (step S14). Region S0 in FIG. 39 is this target region. Target region S0 is then combined with the region $S_1$ adjacent thereto (step S15).

The previously obtained lane width wf(h) is then referenced to calculate horizontal width w(h) (step S16).

If wf(h)>w(h) (step S17), the procedure loops back to step S15. If wf≤w (step S17) and the height h of the combined regions is greater than a defined height h0, the procedure terminates.

Note that h0 is the height of the vanishing point of the road, which is a constant height determined by the installation height of the digital image pickup 41 if the road is level. If h<h0, the combined region is combined with the region adjacent thereto above and narrower than the top width of the lower combined region; in FIG. 39 regions S2 and S3 are combined. The procedure finally terminates when the height h=h0.

By thus segmenting the image based on the lane width, and using known properties of the road configuration in the image to extract the lane area, accurate lane area extraction is possible. Note that the lane area can also be extracted by segmenting the image using a brightness pattern comparison in combination with the method described above.

Figure 42:
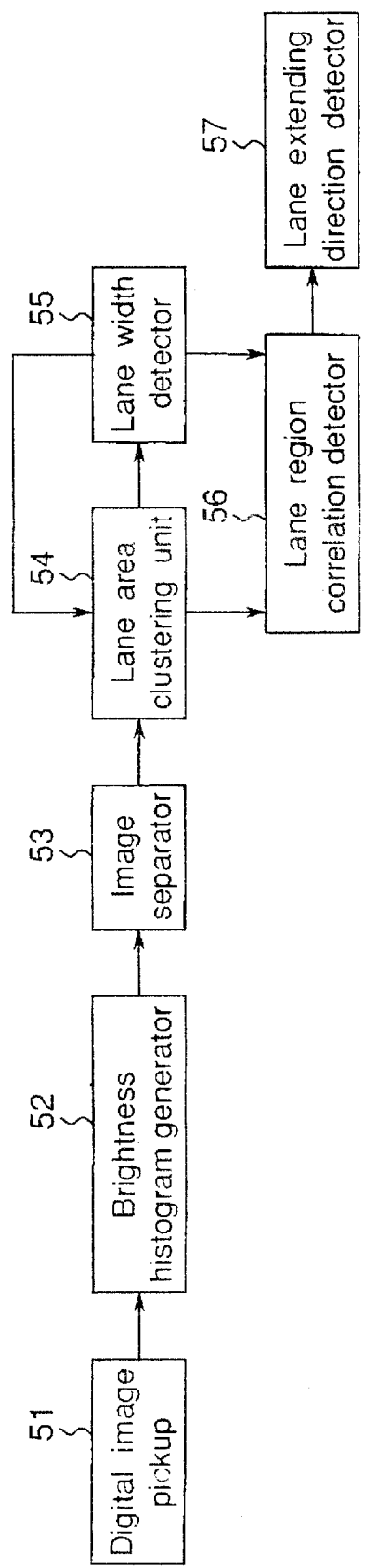
FIG. 42 is a block diagram of a road area extraction apparatus according to a fourth alternative of the second embodiment of the present invention.
Figure 43:
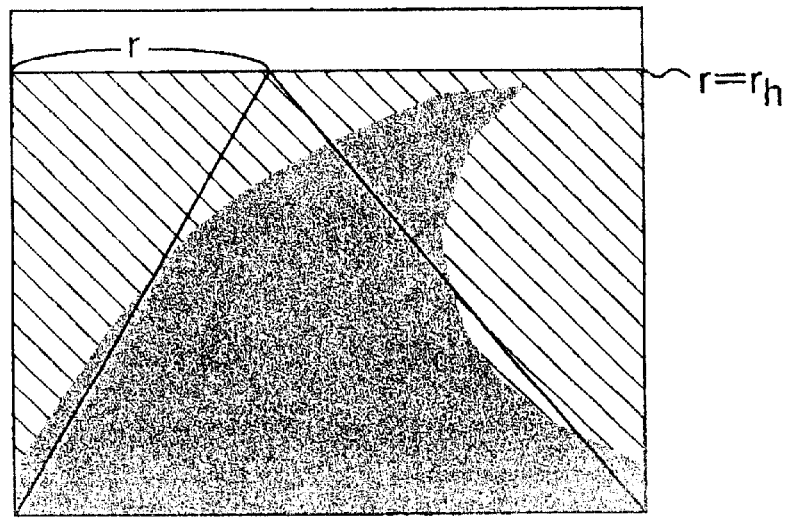
FIG. 43 is used to describe the relationship between extracted lane area obtained by the road area extraction apparatus shown in FIG. 42, and a triangle formed in the image from the vanishing point and road edge pixels.
Figure 44:
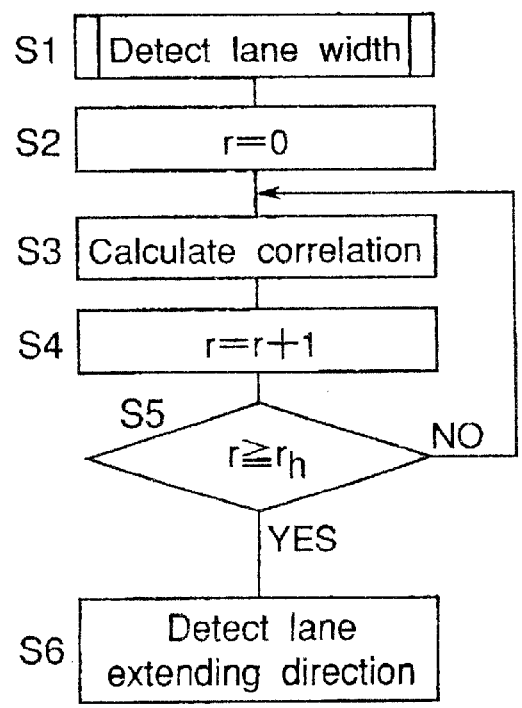
FIG. 44 is a flow chart used to describe the overall operation of the road area extraction apparatus shown in FIG. 42.
Figure 45:
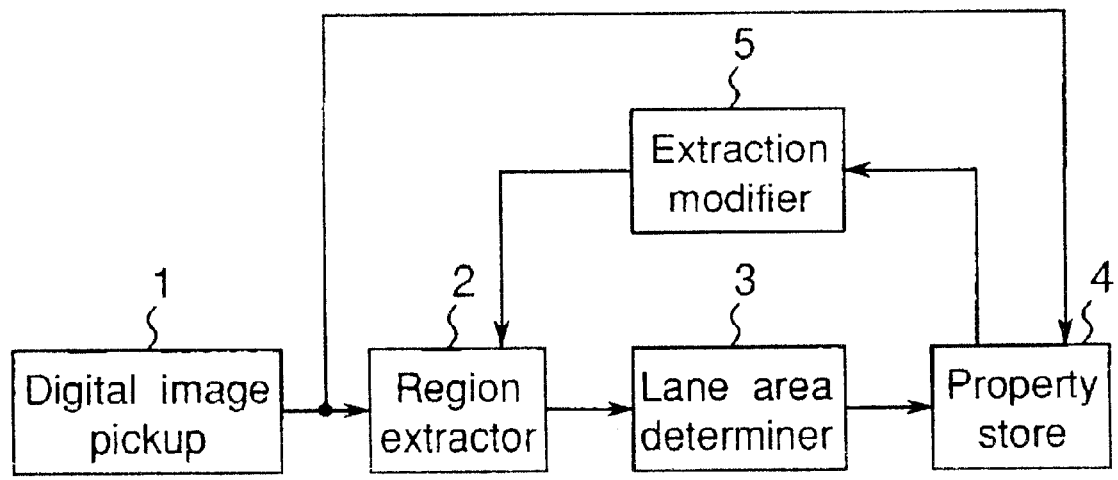
FIG. 45 is a block diagram of a road area extraction apparatus according to the prior art.

A fourth alternative of a road area extraction apparatus according to the second embodiment of the present invention is described next below with reference to FIGS. 42 to 44. This road area extraction apparatus comprises a digital image pickup 51, brightness histogram generator 52, image separator 53, lane area clustering unit 54, lane width detector 55, lane region correlation detector 56, and lane extending direction detector 57.

The digital image pickup 51 is typically a video camera used for capturing an image of the road in front of the vehicle as described in the preceding alternatives.

The brightness histogram generator 52 produces a brightness histogram from the input road image data as shown in FIG. 38. Using this brightness histogram, the brightness histogram generator 52 also detects the vehicle position in the image, i.e., detects the luminance at the bottom middle part of the image.

The image separator 53 then detects all valleys in from the brightness distribution.

Based on the lane width information from the lane width detector 55, the lane area clustering unit 54 merges the segment below the vehicle with the first horizontal segment, and then with a segment in the vertical direction. The lane width detector 55 obtains the lane width from the image height based on the lane area obtained from the lane area clustering unit 54.

The lane region correlation detector 56 calculates the correlation between the lane area detected by the lane area clustering unit 54, and a triangle defined by a particular point on the vanishing line and two lane edge positions at the bottom of the image supplied from the lane width detector 55.

The lane extending direction detector 57 detects the direction of the lane relative to the vehicle from the point on the vanishing line providing the highest correlation value.

The road area extraction apparatus thus comprised operates as described below with reference to the flow chart in FIG. 42.

The lane width is first detected (step S1) using the method of the third alternative of the second embodiment described above.

A point r on the vanishing line is then initialized to 0, i.e., to the coordinate value at the left edge of the vanishing line (step S2).

The correlation between the extracted lane area and the triangle formed using point r=0, i.e., the number of matching pixels, is then calculated.

Point r is then incremented to r=r+1 (step S4), thus moving the vanishing point one pixel to the right. If r does not exceed pixel rh at the right edge of the image (step S5), the procedure loops back to step S3 to repeat the correlation calculation. If r is beyond the right edge, the value of r resulting in the highest correlation is detected (step S6). If r is greater than half (rh/2) the number of horizontal pixels in the image, the lane is to the right of the vehicle. if r<rh/2, the lane is to the left of the vehicle.

By thus obtaining the correlation between the detected lane area and a triangle formed between the vanishing point and the lane edges, the direction of the lane relative to the vehicle can be easily obtained using the maximum correlation value.

A local positioning apparatus according to the first embodiment of the invention can thus separately detect the contour points of the road area and lane marker candidates using low and high frequency images with no spatial frequency overlap. The effects of noise can therefore be reduced when compared with lane extraction using only a high frequency image, the method of the prior art, and lane markers can be detected with high precision.

The lane area can also be accurately detected in the road image by means of the road area extraction apparatus according to the second embodiment of the invention by detecting the lane area from the image data, and detecting a lane area polygon starting from the bottom center of the image, a point corresponding to directly in front of the vehicle.

The lane area can also be accurately detected in the road image by detecting the area containing the luminance values of the pixels directly in front of the vehicle from a brightness histogram, and using the image area corresponding thereto to detect the edges of the lane area starting from the bottom center of the image, a point corresponding to directly in front of the vehicle.

The lane area can also be accurately detected by detecting patterns identical to the brightness distribution pattern directly before the vehicle.

The lane area can also be accurately detected by detecting the area containing the luminance values of the pixels directly in front of the vehicle from a brightness histogram, calculating the brightness values containing the frequency of the number of pixels in the lane area of the image, which is previously determined, and defining the pixels in this area as the lane area.

The lane area can also be accurately detected by calculating image segments by a road width and luminance pattern comparison, and using known features of the road configuration in the image to extract the lane area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A road area extraction apparatus for use with a vehicle, said apparatus comprising:
   a road imaging device to capture an image including a road before the vehicle;
   a brightness histogram generating means for creating a brightness histogram of the image data captured by said road imaging device, said brightness histogram indicating number of pixels with respect to brightness of the image captured by said road imaging device, said brightness histogram including a peak between two valleys;
   a road brightness separating means for separating areas containing luminance values immediately before the vehicle and contained between the valleys in the brightness histogram; and
   a road area detecting means for detecting a road area, including a point directly before the vehicle in an image plane, in the areas separated by said road brightness separating means, wherein the road area is extracted as one continuous area in the image plane.

2. A road area extraction apparatus according to claim 1, further comprising:
   a pixel count means for obtaining a basic number of pixels corresponding to said road area and obtaining a sum number of the pixels contained in the road image data using the brightness histogram;
   a comparing means for comparing said sum number of the pixels of the road image data with said basic number of the pixels corresponding to the road area;
   a brightness range expanding means for expanding a brightness range of the brightness histogram when said comparing means determines that the sum number of the pixels of the road image data is less than the basic number of the pixels corresponding to the road area; and
   a sum pixel number changing means for changing the sum number of the pixels contained in the road image data based on the expanded brightness range;
   said road area detecting means detecting a road area in said image plane when said comparing means determines that the sum number of the pixels of the road image data is not less than the basic number of the pixels corresponding to the road area.

3. A road area extraction apparatus according to claim 1, further comprising a road width detection means for calculating a road width at various heights in the image based on the road width at an image bottom of the road area.

4. A road area extraction apparatus according to claim 3, further comprising:
   a correlation detecting means for calculating a correlation between a detected road area and a triangle having its top point aligned to a vanishing line, said top point shifted along said vanishing line to find a triangle which matched best with the detected road area; and
   a direction detecting means for detecting a road extending direction relative to the vehicle using the best matched triangle.

5. A road area extraction apparatus for use with a vehicle, said apparatus comprising:
   a road imaging device to capture an image including a road before the vehicle;
   a region obtaining means for obtaining a first region including a point before the vehicle in an image plane and neighboring regions continuously expanding from said first region;
   a brightness pattern detection means for detecting a reference brightness pattern of said first region and detecting brightness patterns of said neighboring regions wherein said reference brightness pattern is a brightness pattern of a histogram expressed by numbers of pixels with respect to the brightness in said first region, and said brightness patterns of said neighboring regions are brightness patterns of histograms expressed by numbers of pixels with respect to the brightness in said neighboring regions, respectively;
   a comparing means for comparing said reference brightness pattern with said brightness patterns of said neighboring regions;
   a determining means for determining said neighboring region as a part of the road area when said brightness pattern of said neighboring region is similar to said reference brightness pattern; and
   a road area detecting means for detecting a road area by combining said neighboring regions determined as a part of the road area.

6. A road area extraction apparatus according to claim 5, further comprising a road width detection means for calculating a road width at various heights in the image based on the road width at an image bottom of the road area.

7. A road area extraction apparatus according to claim 6, further comprising:
   a correlation detecting means for calculating a correlation between a detected road area and a triangle having its top point aligned to a vanishing line, said top point shifted along said vanishing line to find a triangle which matched best with the detected road area; and
   a direction detecting means for detecting a road extending direction relative to the vehicle using the best matched triangle.

* * * * *